(12) United States Patent
Takei et al.

(10) Patent No.: US 12,546,587 B2
(45) Date of Patent: Feb. 10, 2026

(54) MEASUREMENT HEAD AND CONFOCAL DISPLACEMENT SENSOR

(71) Applicant: Keyence Corporation, Osaka (JP)

(72) Inventors: Hideto Takei, Osaka (JP); Yoshihisa Minamigawa, Osaka (JP); Takumi Koga, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 103 days.

(21) Appl. No.: 18/660,260

(22) Filed: May 10, 2024

(65) Prior Publication Data

US 2025/0003736 A1     Jan. 2, 2025

(30) Foreign Application Priority Data

Jun. 29, 2023   (JP) .................................. 2023-107407

(51) Int. Cl.
*G01B 11/24*     (2006.01)

(52) U.S. Cl.
CPC .................................... *G01B 11/24* (2013.01)

(58) Field of Classification Search
CPC .... G01B 11/24; G01B 2210/50; G01B 11/02; G02B 6/32; G01D 5/35354
See application file for complete search history.

(56) References Cited

U.S. PATENT DOCUMENTS

| | | |
|---|---|---|
| 10,161,740 B1 | 12/2018 | Takei et al. |
| 10,180,355 B2 | 1/2019 | Kuga |
| 10,215,631 B2 | 2/2019 | Takei et al. |
| 10,260,859 B2 | 4/2019 | Kuga |
| 10,267,621 B2 | 4/2019 | Kuga et al. |
| 10,267,622 B2 | 4/2019 | Kuga |
| 10,473,455 B2 | 11/2019 | Kuga |
| 10,591,278 B2 | 3/2020 | Kuga |
| 10,591,280 B2 * | 3/2020 | Fujimoto ............. G01B 11/272 |
| 11,060,917 B2 | 7/2021 | Kuga |
| 12,117,598 B2 * | 10/2024 | Feng ...................... G02B 7/004 |

FOREIGN PATENT DOCUMENTS

JP          20192722 A     1/2019

* cited by examiner

*Primary Examiner* — Tony Ko
(74) *Attorney, Agent, or Firm* — Kilyk & Bowersox, P.L.L.C.

(57) ABSTRACT

Provided is a measurement head and a confocal displacement sensor which are capable of suppressing a decrease in reliability of measurement in a high-temperature environment of the confocal displacement sensor. The measurement head is a measurement head for a confocal displacement sensor having a white light source. The measurement head has a configuration in which a plurality of glass lenses are accommodated in a head metal housing. A metal spring member biases the plurality of glass lenses including the lens toward the +x direction in a state where the lens abuts on the ring screw is provided in the head metal housing. Or a thermal expansion polyimide member provided inside the metal housing.

15 Claims, 11 Drawing Sheets

MEASUREMENT HEAD AND CONFOCAL DISPLACEMENT SENSOR

CROSS-REFERENCE TO RELATED APPLICATIONS

The present application claims foreign priority based on Japanese Patent Application No. 2023-107407, filed Jun. 29, 2023, the contents of which are incorporated herein by reference.

BACKGROUND OF THE INVENTION

1. Technical Field

The invention relates to a measurement head for a confocal displacement sensor and a confocal displacement sensor.

2. Description of the Related Art

Examples of a device that measures a displacement of a surface of a measurement object by a non-contact method include a confocal displacement sensor including a white light source, an optical fiber, and a measurement head. In the confocal displacement sensor, light (white light) in a wide wavelength band generated by the white light source is guided to the measurement head through the optical fiber. The measurement head mainly includes a plurality of lenses and a head housing accommodating them, and emits light guided through the optical fiber to a measurement object through the plurality of lenses. At this time, a chromatic aberration is generated in the light emitted to the measurement object through the plurality of lenses. In addition, the measurement head receives light focused and reflected on the surface of the measurement object. The displacement of the surface of the measurement object is measured based on the light received by the measurement head. According to the confocal displacement sensor, a measurable range of the measurement object is expanded by arranging the measurement head at a desired position.

The measurement accuracy of a displacement by the confocal displacement sensor decreases due to various factors. Therefore, configurations for suppressing the decrease in the measurement accuracy have been proposed.

For example, JP2019-002722A proposes a confocal displacement sensor including a diffraction lens and a refraction lens having different polarities of spherical aberrations in order to suppress a decrease in measurement accuracy caused by spherical aberrations of optical components (lenses of a measurement head).

Meanwhile, in a case where the measurement object is arranged in a high temperature environment, it is conceivable to arrange the measurement head in a high temperature environment. However, the positional relationship of the plurality of lenses is likely to randomly change every time the measurement head is arranged in the high temperature environment depending on a temperature of an environment in which the measurement head is arranged, a linear expansion coefficient of each constituent element of the measurement head, and the like. In addition, in a case where any of the plurality of lenses contains a resin material, the resin material is highly likely to be deformed in the high temperature environment. In these cases, the reliability of measurement in the high temperature environment of the confocal displacement sensor decreases.

SUMMARY OF THE INVENTION

An object of the invention is to provide a measurement head and a confocal displacement sensor which are capable of suppressing a decrease in reliability of measurement in a high temperature environment of the confocal displacement sensor.

According to one embodiment of the invention, a measurement head is a measurement head for a confocal displacement sensor having a white light source, and includes: a housing that is made of metal, is formed in a tubular shape, and has a first end portion and a second end portion; an optical fiber that is connected to the first end portion of the housing and guides light generated from the white light source to the first end portion of the housing; a plurality of lenses that is made of glass, includes a first lens, is accommodated inside the housing to be aligned in an axial direction of the housing and to be movable in the axial direction, and converges the light guided to the first end portion by the optical fiber on a measurement object through the second end portion while generating a chromatic aberration along an optical axis; a first movement restricting portion that is provided in a predetermined first portion inside the housing and restricts movement of the first lens in any one direction of a first direction from the first end portion toward the second end portion in the axial direction and a second direction opposite to the first direction, when the first lens abuts on the first movement restricting portion; and a biasing member that is made of metal and biases some or all of the plurality of lenses including the first lens by an elastic force in the one direction in a state where the first lens abuts on the first movement restricting portion.

According to another embodiment of the invention, a measurement head is a measurement head for a confocal displacement sensor having a white light source, and includes: a housing that is made of metal, is formed in a tubular shape, and has a first end portion and a second end portion; an optical fiber that is connected to the first end portion of the housing and guides light generated from the white light source to the first end portion of the housing; a plurality of lenses that is made of glass, includes a first lens, is accommodated inside the housing to be aligned in an axial direction of the housing and to be movable in the axial direction, and converges the light guided to the first end portion by the optical fiber on a measurement object through the second end portion while generating a chromatic aberration along an optical axis; a first movement restricting portion that is provided in a predetermined first portion inside the housing and restricts movement of the first lens in any one direction of a first direction from the first end portion toward the second end portion in the axial direction and a second direction opposite to the first direction, when the first lens abuts on the first movement restricting portion; and a thermal expansion member that is made of polyimide and is provided at a position separated from the first movement restricting portion in the axial direction inside the housing, in which some or all of the plurality of lenses including the first lens are held between the first movement restricting portion and a fixing member in a state where the first lens abuts on the first movement restricting portion.

According to still another embodiment of the invention, a confocal displacement sensor includes: the above-described measurement head; a white light source that generates light to be guided to the measurement head; and a displacement measurement unit that calculates a displacement of a measurement object based on light emitted from the measurement head to the measurement object and reflected by the measurement object.

According to the invention, it is possible to suppress the decrease in the reliability of measurement in the high temperature environment of the confocal displacement sensor.

DETAILED DESCRIPTION

Hereinafter, a measurement head according to an embodiment of the invention and a confocal displacement sensor including the same will be described with reference to the drawings.

1. Basic Configuration of Confocal Displacement Sensor

Figure 1:
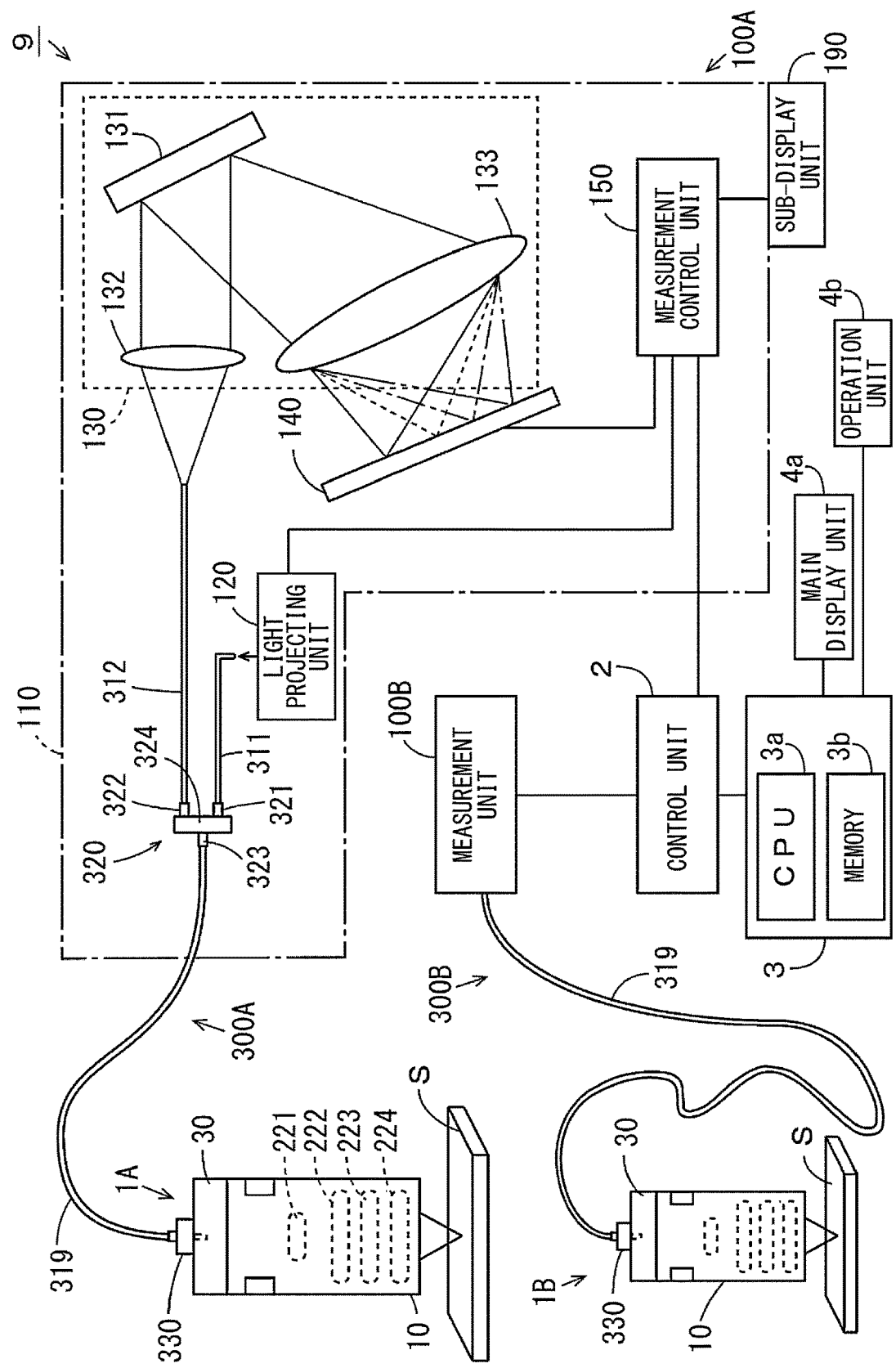
FIG. 1 is a schematic diagram illustrating a configuration of a confocal displacement sensor according to an embodiment of the invention.

FIG. 1 is a schematic diagram illustrating a configuration of a confocal displacement sensor according to an embodiment of the invention. As illustrated in FIG. 1, a confocal displacement sensor 9 includes measurement heads 1A and 1B, measurement units 100A and 100B, light guiding units 300A and 300B, a control unit 2, and a personal computer (PC) 3. The light guiding unit 300A includes a plurality of optical fibers, and optically connects the measurement head 1A and some constituent elements (a light projecting unit 120 and a spectroscopic unit 130 to be described later) inside the measurement unit 100A.

The measurement unit 100A includes a unit housing 110, the light projecting unit 120, the spectroscopic unit 130, a light receiving unit 140, a measurement control unit 150, and a sub-display unit 190. The unit housing 110 accommodates the light projecting unit 120, the spectroscopic unit 130, the light receiving unit 140, and the measurement control unit 150. The sub-display unit 190 includes a display such as a seven-segment display or a dot matrix display, and is attached to the unit housing 110. The light projecting unit 120 includes a white light source that generates light having a wide and continuous wavelength band (for example, 500 nm to 700 nm), that is, light (white light) having a plurality of continuous wavelengths, and is configured to be capable of emitting light generated from the white light source. The light emitted by the light projecting unit 120 is input to an optical fiber 311, which will be described later, of the light guiding unit 300A.

The spectroscopic unit 130 includes a diffraction grating 131 and a plurality of (two in this example) lenses 132 and 133. As will be described later, a part of the light emitted by the light projecting unit 120 and reflected by a surface of a measurement object S is output from an optical fiber 312, which will be described later, of the light guiding unit 300A. The light output from the optical fiber 312 passes through the lens 132 to be substantially collimated and is incident on the diffraction grating 131. In the present embodiment, the diffraction grating 131 is a reflection type diffraction grating. The light incident on the diffraction grating 131 is divided so as to be reflected at a different angle for each wavelength, and passes through the lens 133 to be focused on different positions in one dimension for each wavelength.

The light receiving unit 140 includes an imaging element (one-dimensional line sensor) in which a plurality of pixels is one-dimensionally arranged. The imaging element may be a multi-division photodiode (PD), a charge-coupled device (CCD) camera, or a complementary metal-oxide semiconductor (CMOS) image sensor, or may be another element. The light receiving unit 140 is arranged such that the plurality of pixels of the imaging element receive light at a plurality of in-focus positions which are different for each wavelength and formed by the lens 133 of the spectroscopic unit 130. An analog electric signal (hereinafter, referred to as a light reception signal) corresponding to the amount of received light is output from each pixel of the light receiving unit 140. The light reception signal indicates the intensity of light received by each pixel.

The measurement control unit 150 includes a central processing unit (CPU) and a memory, or a microcomputer. The measurement control unit 150 stores a control program and stores various types of data such as measurement conditions used for displacement measurement. These pieces of data are given from the control unit 2 to be described later. The measurement control unit 150 controls the light projecting unit 120 and the light receiving unit 140 based on the stored control program and data, and calculates a displacement of the surface of the measurement object S based on the light reception signal output from the light receiving unit 140. The measurement control unit 150 causes the sub-display unit 190 to display a calculation result of the displacement.

The measurement control unit 150 is connected to the control unit 2, and the control unit 2 is further connected to the PC 3. The measurement control unit 150 provides the control unit 2 with the calculation result of the displacement and the light reception signal output from the light receiving unit 140. Configurations and operations of the control unit 2 and the PC 3 will be described later.

The measurement head 1A includes a head housing 10, a fiber receptacle 30, and a plurality of (four in this example) lenses 221, 222, 223, and 224. The head housing 10 accommodates the plurality of lenses 221, 222, 223, and 224.

The fiber receptacle 30 is attached to the head housing 10. A fiber connector 330 (to be described later) of the light guiding unit 300A is connected to the fiber receptacle 30. The fiber connector 330 holds one end portion of an optical fiber 319, which will be described later, of the light guiding unit 300A.

Light is guided from the measurement unit 100A to the optical fiber 319. The light guided to the optical fiber 319 is output from the optical fiber 319 in the head housing 10 of the measurement head 1A and passes through the plurality of lenses 221, 222, 223, and 224 in this order. In the present embodiment, each of the plurality of lenses 221, 222, 223, and 224 has a circular shape as viewed in an optical axis direction of the lens, and is configured using a single member made of glass. In addition, the lens 221 is a magnifying lens that magnifies light guided from the optical fiber 319. The lenses 222 and 223 are a curved lens that converges the light magnified by the lens 221 while adding a predetermined function thereto. Furthermore, the lens 224 is a chromatic aberration lens that generates a chromatic aberration in the light guided from the lens 223. The light in which the chromatic aberration is generated while passing through the plurality of lenses 221, 222, 223, and 224 is focused at a position near the surface of the measurement object S.

The light guiding unit 300A includes the optical fibers 311, 312, and 319, a fiber coupler 320, and the fiber connector 330. In the example of FIG. 1, the fiber coupler 320 is provided in the unit housing 110 of the measurement unit 100A. The fiber connector 330 is connected to the measurement head 1A as described above.

The fiber coupler 320 has a so-called 2×2 type configuration and includes four ports 321 to 323 and a main body 324. In FIG. 1, illustration of one port among the four ports is omitted. The ports 321 and 322 and the port 323 are connected to the main body 324 so as to face each other with the main body 324 interposed therebetween. Light input to at least one port of the ports 321 and 322 is output from the port 323. Light input to the port 323 is output from each of the ports 321 and 322.

The optical fibers 311 and 312 are respectively connected to the ports 321 and 322 of the fiber coupler 320. The other end portion of the optical fiber 319 is connected to the port 323 of the fiber coupler 320.

According to this configuration, the light emitted by the light projecting unit 120 of the measurement unit 100A is input to the port 321 of the fiber coupler 320 through the optical fiber 311. The light input to the port 321 is output from the port 323 and guided to the measurement head 1A through the optical fiber 319. The light guided to the measurement head 1A is emitted to the measurement object S through the plurality of lenses 221, 222, 223, and 224.

A part of light reflected by the surface of the measurement object S is input to the one end portion of the optical fiber 319 through the plurality of lenses 224, 223, 222, and 221. The light input to the one end portion of the optical fiber 319 is input to the port 323 of the fiber coupler 320. The light input to the port 323 is output from the ports 321 and 322. The light output from the ports 321 and 322 is guided to the spectroscopic unit 130 through the optical fiber 312. As a result, the displacement of the measurement object S is calculated based on the light emitted from the measurement unit 100A to the measurement object S.

The measurement unit 100A and the measurement unit 100B have the same configuration, the measurement head 1A and the measurement head 1B have the same configuration, and the light guiding unit 300A and the light guiding unit 300B have the same configuration. The measurement head 1B and some constituent elements inside the measurement unit 100B are optically connected by the light guiding unit 300B, similarly to the example of the connection between the measurement head 1A and the measurement unit 100A described above. In addition, the measurement control unit 150 (not illustrated) of the measurement unit 100B is connected to the control unit 2.

The measurement object S is irradiated with light emitted from the light projecting unit 120 (not illustrated) of the measurement unit 100B through the measurement head 1B. A part of the light reflected by the surface of the measurement object S is returned to the measurement unit 100B through the measurement head 1B. Accordingly, a displacement of the measurement object S is calculated based on the light emitted from the measurement head 1B to the measurement object S. In this case, the measurement control unit 150 (not illustrated) provided in the measurement unit 100B gives the control unit 2 a calculation result of the displacement and a light reception signal output from the light receiving unit 140.

The control unit 2 includes a CPU and a memory, or a microcomputer. For example, displacement measurement conditions in the measurement units 100A and 100B are input from the PC 3 to the control unit 2. The measurement conditions include, for example, a light emission amount in the light projecting unit 120, a light emission timing in the light projecting unit 120, an exposure amount in the light receiving unit 140, and the like. The control unit 2 gives the input measurement conditions to the measurement control unit 150 of each of the measurement units 100A and 100B. Accordingly, a measurement operation based on the given measurement conditions is performed in each of the measurement units 100A and 100B.

The PC 3 includes a CPU 3a and a memory 3b. The memory 3b stores various programs related to thickness measurement of the measurement object S and various types of data used for the thickness measurement. The CPU 3a executes the programs stored in the memory 3b. The calculation result of the displacement and the light reception signal given from each of the measurement units 100A and 100B to the control unit 2 are given from the control unit 2 to the PC 3.

A main display unit 4a and an operation unit 4b are connected to the PC 3. The main display unit 4a includes, for example, a display device such as an organic electroluminescence (EL) panel or a liquid crystal display panel. The operation unit 4b includes a keyboard and a pointing device. The pointing device includes a mouse, a joystick, or the like. A user can give various instructions related to the thickness measurement to the PC 3 by operating the operation unit 4b.

In the above-described confocal displacement sensor 9, each of the measurement heads 1A and 1B can be arranged in a space in which one or more measurement objects S are arranged, and thus, the degree of freedom of displacement measurement for the one or more measurement objects S is high. For example, in a case where the measurement object S is a substrate (wafer) or the like on which a circuit is being formed, the measurement object S is highly likely to be arranged in a high temperature environment and a vacuum environment. Even in such a case, the displacement of the surface of the measurement object S (a height of a substrate surface) can be measured in the high temperature environment by arranging each of the measurement heads 1A and 1B together with the measurement object S in the high temperature environment. In addition, the displacement of the surface of the measurement object S (the height of the substrate surface) can be measured in the vacuum environment by arranging each of the measurement heads 1A and 1B together with the measurement object S in the vacuum environment. Here, in the present embodiment, the high temperature environment refers to a temperature environment of, for example, about 100° C. to 300° C. In addition, the vacuum environment refers to an environment having a degree of vacuum of, for example, about $10^{(-7)}$ Pa to $10^{(-5)}$ Pa.

Note that, according to the measurement heads 1A and 1B, a thickness of the measurement object S having a first surface and a second surface which face opposite directions can be measured. For example, the measurement heads 1A and 1B are arranged so as to face each other with the measurement object S interposed therebetween. In addition, displacements of the first surface and the second surface of the measurement object S are measured by the measurement heads 1A and 1B. In this case, the thickness of the measurement object S can be measured based on measurement results of the displacements of the first surface and the second surface of the measurement object S and a distance (head-to-head distance) between the measurement heads 1A and 1B.

2. Measurement Heads 1A and 1B

Hereinafter, the configuration of the measurement head 1A will be described in detail as a representative of the measurement heads 1A and 1B in FIG. 1.

<1> External Shape of Head Housing 10 of Measurement Head 1A

Figure 2:
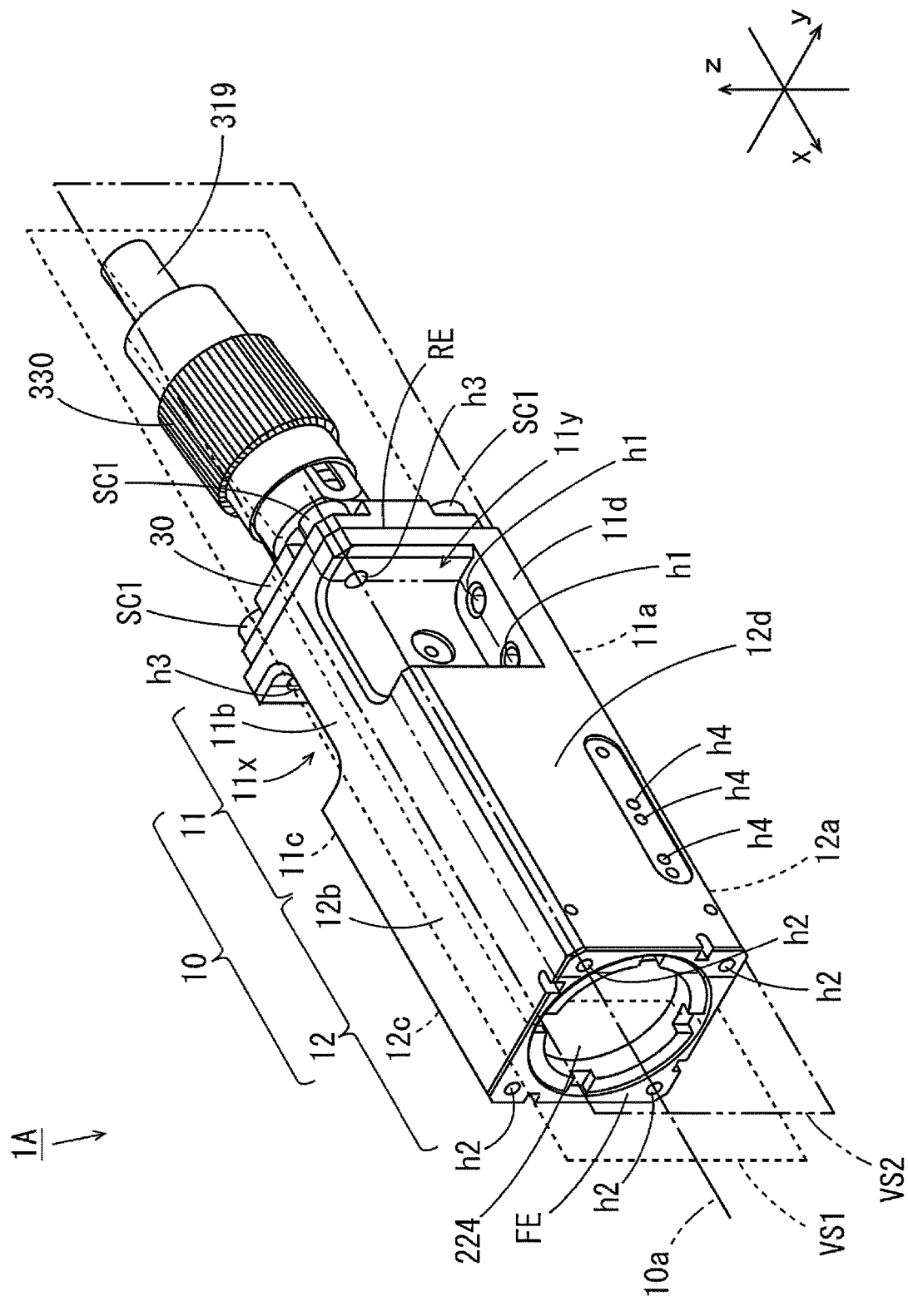
FIG. 2 is an external perspective view illustrating an example of a measurement head according to the embodiment of the invention.

FIG. 2 is an external perspective view illustrating an example of the measurement head 1A according to the embodiment of the invention. In FIG. 2 and predetermined views to be described later, arrows indicating an x direction, a y direction, and a z direction, which are orthogonal to each other, are attached such that the positional relationship among the respective units of the measurement head 1A and a plurality of constituent elements accommodated in the measurement head 1A can be easily understood.

In the following description, in the x direction, a direction in which an arrow x is oriented in the drawing is appropriately referred to as a +x direction, and its opposite direction is appropriately referred to as a −x direction. In addition, in the y direction, a direction in which an arrow y is oriented in the drawing is appropriately referred to as a +y direction, and its opposite direction is appropriately referred to as a −y direction. Furthermore, in the z direction, a direction in which an arrow z is oriented in the drawing is appropriately referred to as a +z direction, and its opposite direction is appropriately referred to as a −z direction.

The head housing 10 of the measurement head 1A is configured using a single member made of metal and has a substantially rectangular tube shape extending in the x direction as illustrated in FIG. 2. In the following description, an end of the head housing 10 on one side facing the +x direction is referred to as a front end portion FE of the head housing 10, and an end of the head housing 10 on the other side facing the −x direction is referred to as a rear end portion RE of the head housing 10. The center axis of the head housing 10 extending in the longitudinal direction of the head housing 10 is referred to as a head axis 10a. The metal forming the head housing 10 is, for example, stainless steel. In the present embodiment, SUS 304, SUS 316, SUS 316L, or SUS 303 defined by Japanese Industrial Standards (JIS) is used as stainless steel of the head housing 10.

The head housing 10 includes a first housing section 11 and a second housing section 12 aligned in the x direction. The first housing section 11 has the rear end portion RE of the head housing 10, and includes an outer surface 11a facing the −z direction, an outer surface 11b facing the +z direction, an outer surface 11c facing the −y direction, and an outer surface 11d facing the +y direction. The second housing section 12 has the front end portion FE of the head housing 10 and includes an outer surface 12a facing the −z direction, an outer surface 12b facing the +z direction, an outer surface 12c facing the −y direction, and an outer surface 12d facing the +y direction. At a boundary portion between the first housing section 11 and the second housing section 12, two outer surfaces (an outer surface of the first housing section 11 and an outer surface of the second housing section 12), which face the common direction and are adjacent to each other in the x direction, are flush with each other.

With such a configuration, the measurement head 1A can easily attach a part of the outer surface of the head housing 10 onto a flat installation surface. In addition, according to the above configuration, in a case where the two measurement heads 1A are arranged adjacent to each other, the head housing 10 of one measurement head 1A out of the two measurement heads 1A and the head housing 10 of the other measurement head 1A can be brought into surface contact with each other. Accordingly, the plurality of measurement heads 1A can be stably installed on a predetermined installation surface as compared with a case where the head housing 10 has a cylindrical outer peripheral surface.

Here, two notches 11x and 11y are formed in the first housing section 11. The two notches 11x and 11y are aligned in the circumferential direction with respect to the head axis 10a. Specifically, one notch 11x is formed so as to notch a part of the outer surfaces 11b and 11c, and the other notch 11y is formed so as to notch a part of each of the outer surfaces 11b and 11d. No notch is formed in the outer surface 11a. As a result, as illustrated in the third balloon from the left in FIG. 3 to be described later, a cross section orthogonal to the x direction of a portion of the first housing section 11 where the two notches 11x and 11y are formed has a T-shape (an inverted T-shape in FIG. 3).

Two through-holes h1 (see FIG. 3 to be described later) extending in the z direction are formed in a portion of the first housing section 11 located between a space in which the notch 11x is formed and a space in the −z direction with respect to the first housing section 11. In addition, two through-holes h1 extending in the z direction are formed also in a portion of the first housing section 11 located between a space in which the notch 11y is formed and the space in the −z direction with respect to the first housing section 11. These plurality of through-holes h1 are used, for example, to attach the measurement head 1A to a desired member. In this case, a screw member, a binding member, or the like is inserted into any of the plurality of through-holes h1.

A circular opening portion through which light is emitted from the measurement head 1A toward the measurement object S and light reflected by the measurement object S passes is formed in the front end portion FE of the head housing 10. The example of FIG. 2 illustrates a state in which a part of the lens 224 accommodated in the head housing 10 is exposed from the opening portion of the front end portion FE. In addition, four screw holes h2 are respectively formed at four corners of the front end portion FE of the head housing 10 so as to surround the opening portion at intervals of 90° as viewed in the x direction. The four screw holes h2 of the front end portion FE are used to attach a light bending unit 50 (FIG. 10) or distance adjustment members 60 (FIG. 10), which will be described later, as necessary when the measurement head 1A is used.

A plurality of (four in this example) screw holes h3 extending in the x direction are formed in the rear end portion RE of the head housing 10. The four screw holes h3 in this example are respectively formed at four corners of the rear end portion RE of the head housing 10. The four screw holes h3 of the rear end portion RE are used to connect the fiber receptacle 30 to the head housing 10 using four screws SC1. In the present embodiment, the fiber receptacle 30 and the fiber connector 330 connected to the head housing 10 are formed using the same material as that of the head housing 10.

A plurality of through-holes h4 through which an internal space of the head housing 10 communicates with an external space are formed in a part of a plurality of outer surfaces (11a to 11d and 12a to 12d) of the head housing 10. FIG. 2 illustrates a state in which the plurality of through-holes h4 are formed in one outer surface 12d of the second housing section 12. These through-holes h4 suppress generation of a large pressure difference between the internal space and the external space of the head housing 10, for example, when the measurement head 1A is arranged in the vacuum environment.

<2> Internal Shape of Head Housing 10

Figure 3:
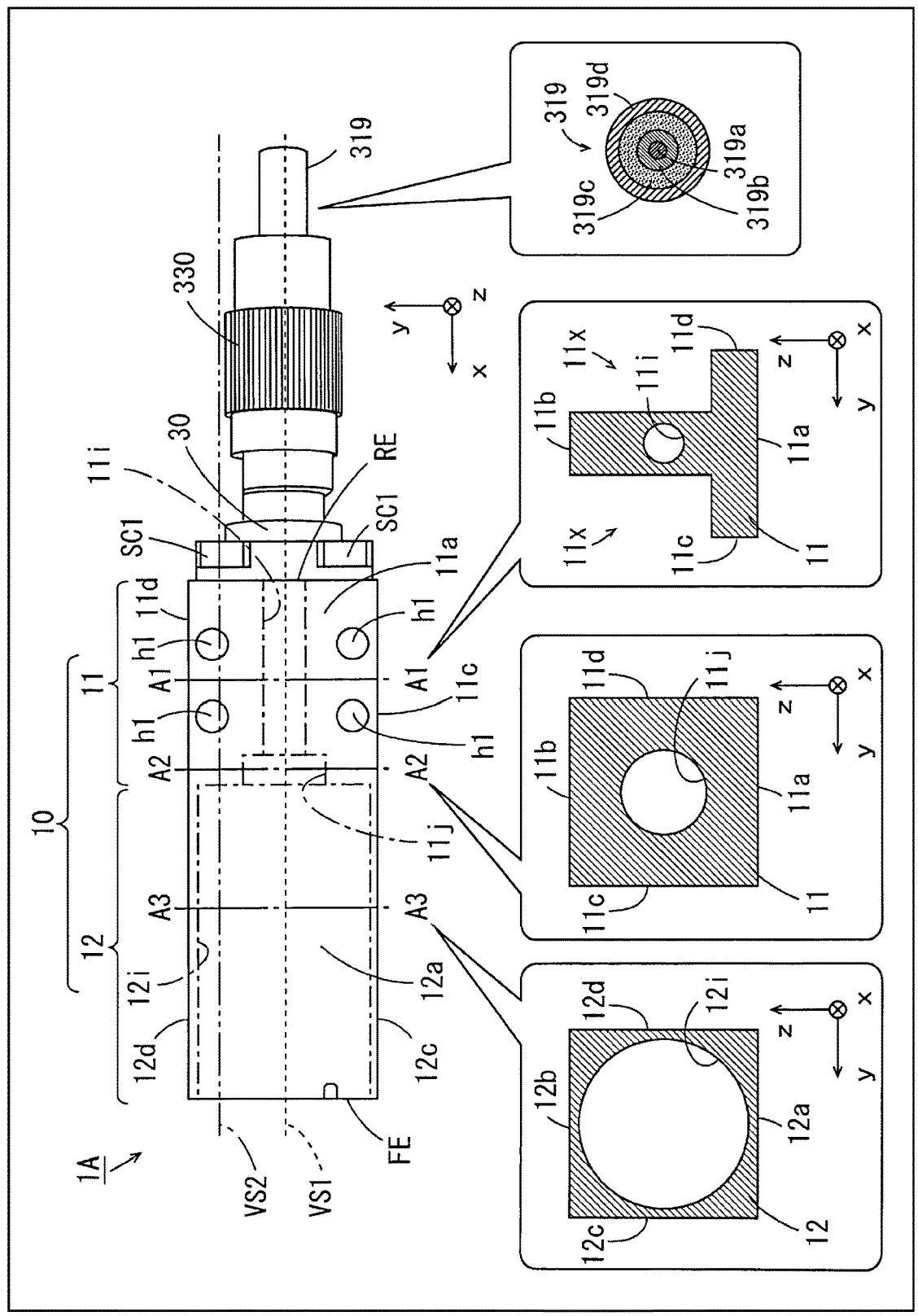
FIG. 3 is one side view of the measurement head in FIG. 2 as viewed in the +Z direction.

FIG. 3 is one side view of the measurement head 1A in FIG. 2 as viewed in the +Z direction. The head housing 10 has the internal space extending from the rear end portion RE to the front end portion FE along the head axis 10a. In FIG. 3, a shape of the internal space of the head housing 10 is indicated by a one-dot chain line. In addition, in FIG. 3, schematic cross-sectional views (end views) of the head housing 10 taken along lines A1-A1, A2-A2, and A3-A3 aligned at intervals in the x direction are illustrated in three balloons, respectively.

In the side view of FIG. 3, the lines A1-A1 and A2-A2 are lines overlapping two portions of the first housing section 11, and the line A3-A3 is a line overlapping a portion of the second housing section 12. Each of the first housing section 11 and the second housing section 12 of the head housing 10 has an inner peripheral surface having a circular cross section orthogonal to the head axis 10a.

As illustrated in FIG. 3, the first housing section 11 includes a first inner peripheral surface 11i and a second inner peripheral surface 11j. The first inner peripheral surface 11i has a cylindrical shape having a constant diameter and extending from the rear end portion RE of the head housing 10 to a position near the boundary portion between the first housing section 11 and the second housing section 12. An axis of the first inner peripheral surface 11i coincides with the head axis 10a. In addition, the first inner peripheral surface 11i has, for example, an inner diameter similar to an outer diameter of the optical fiber 319.

The second inner peripheral surface 11j has a cylindrical shape having a constant diameter and extending from an end of the first inner peripheral surface 11i in the +x direction to the boundary portion between the first housing section 11 and the second housing section 12. An axis of the second inner peripheral surface 11j coincides with the head axis 10a. In addition, the second inner peripheral surface 11j has an inner diameter larger than the inner diameter of the first inner peripheral surface 11i. As a result, a stepped portion (a first stepped portion st1 in FIG. 4 to be described later) having an annular shape as viewed in the −x direction is formed inside the first housing section 11.

The second housing section 12 includes a third inner peripheral surface 12i. The third inner peripheral surface 12i has a cylindrical shape having a substantially constant diameter and extending from the boundary portion between the first housing section 11 and the second housing section 12 to the front end portion FE of the head housing 10. An axis of the third inner peripheral surface 12i coincides with the head axis 10a. In addition, the third inner peripheral surface 12i has an inner diameter larger than the inner diameters of the first inner peripheral surface 11i and the second inner peripheral surface 11j of the first housing section 11. As a result, a stepped portion (a second stepped portion st2 in FIG. 4 to be described later) having an annular shape as viewed in the −x direction is formed at the boundary portion between the first housing section 11 and the second housing section 12 inside the head housing 10.

<3> Configuration of Optical Fiber 319

In FIG. 3, a configuration of the optical fiber 319 held by the fiber connector 330 is further illustrated in a balloon drawn from the optical fiber 319. The optical fiber 319 includes a core 319a coated with a cladding 319b. The fiber receptacle 30 is connected to the fiber connector 330, whereby the core 319a at a distal end of one end portion of the optical fiber 319 is held so as to be located on optical axes of the plurality of lenses 221 to 224 (FIG. 1). Note that the head axis 10a of the head housing 10 coincides with the optical axes of the plurality of lenses 221 to 224 (FIG. 1) provided in the head housing 10 in the present embodiment. In addition, the distal end of the one end portion of the optical fiber 319 functions as a spatial filter having minute pinholes in the present embodiment.

In a portion of the optical fiber 319 located between the measurement head 1A and the measurement unit 100A, a coating layer 319c made of a resin using polyimide is provided so as to coat the cladding 319b. Furthermore, a spiral tube 319d made of stainless steel is provided so as to cover the coating layer 319c. The core 319a and the cladding 319b are made of quartz and have high heat resistance. In addition, the coating layer 319c made of polyimide and the spiral tube 319d made of stainless steel have relatively high heat resistance as compared with resins other than polyimide. In this manner, each of the core 319a, the cladding 319b, the coating layer 319c, and the spiral tube 319d has relatively high heat resistance in the optical fiber 319 according to the present embodiment. Therefore, even in the case of being used in the high temperature environment, high reliability for light transmission is provided.

Note that the optical fiber 319 according to the present embodiment has the configuration including only one core 319a as described above. The optical fiber 319 may have a configuration including a plurality of the cores 319a without being limited to such an example. In this case, for example, the plurality of bundled cores 319a are coated with the cladding 319b, and the coating layer 319c and the spiral tube 319d are further provided so as to coat the cladding 319b. Alternatively, the plurality of cores 319a coated with the cladding 319b and the coating layer 319c are bundled. The spiral tube 319d is provided to protect such an assembly.

<4> Various Constituent Elements Provided Inside Head Housing 10

Figure 4:
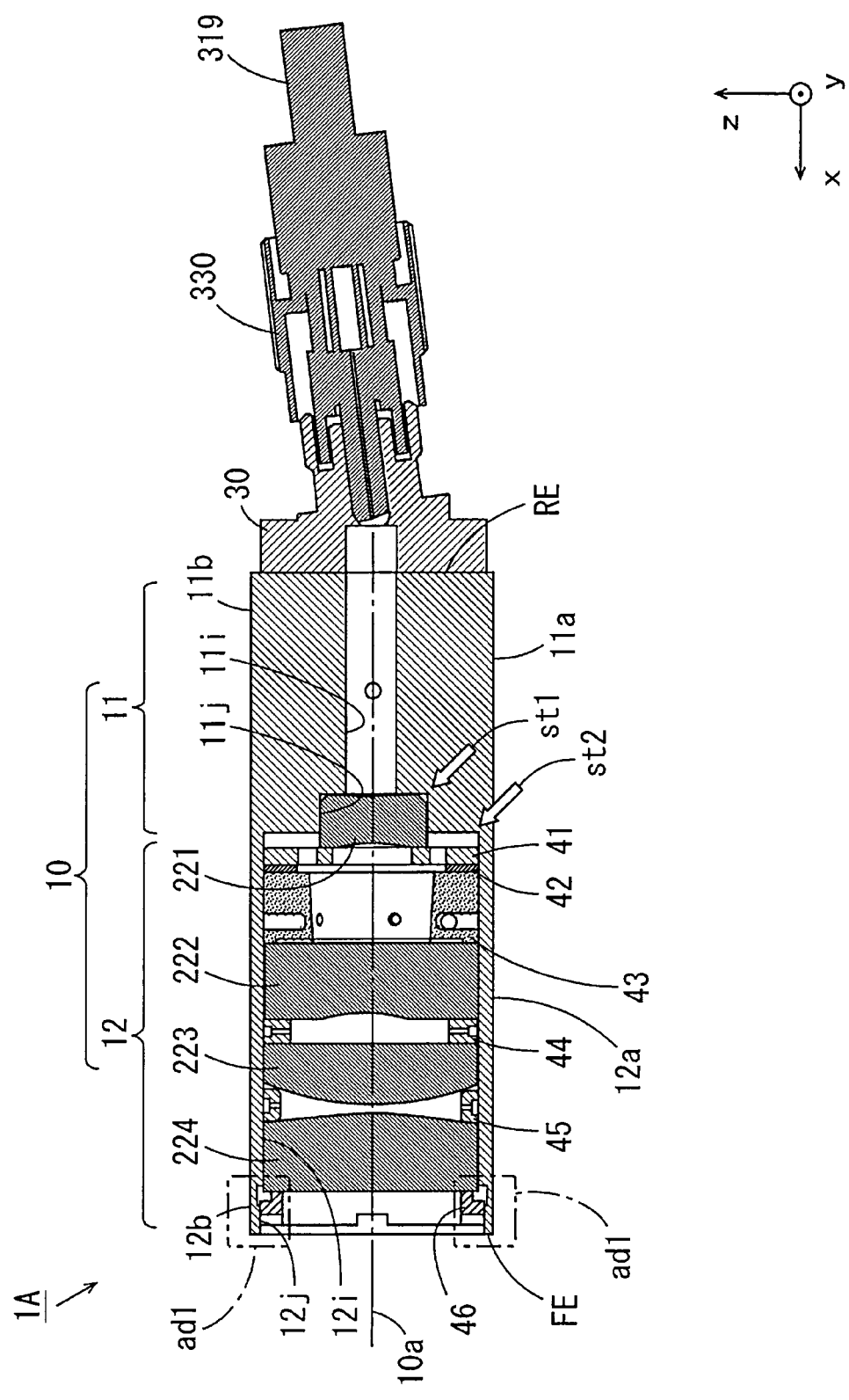
FIG. 4 is a cross-sectional view of the measurement head taken along a virtual plane indicated by dotted lines in FIGS. 2 and 3.
Figure 5:
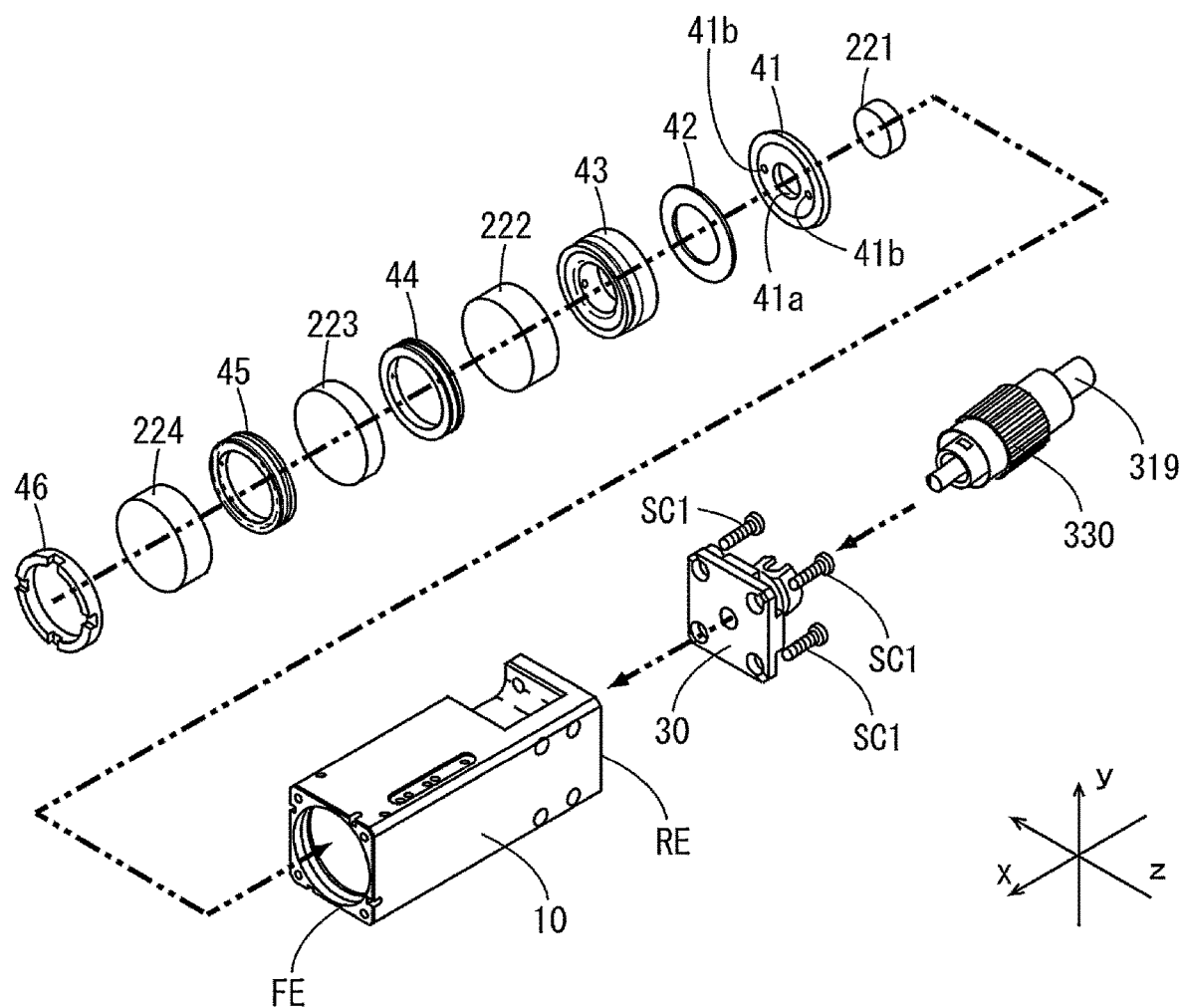
FIG. 5 is an exploded perspective view of the measurement head in FIG. 1.

FIG. 4 is a cross-sectional view of the measurement head 1A taken along a virtual plane VS1 indicated by dotted lines in FIGS. 2 and 3. FIG. 5 is an exploded perspective view of the measurement head 1A in FIG. 1.

As described above, the annular stepped portion is formed inside first housing section 11. In addition, the stepped portion is also formed at the boundary portion between the first housing section 11 and the second housing section 12 inside the head housing 10. In the following description, the stepped portion formed inside the first housing section 11 is referred to as the first stepped portion st1. In addition, the stepped portion formed at the boundary portion between the first housing section 11 and the second housing section 12 inside the head housing 10 is referred to as the second stepped portion st2. In FIG. 4, the first stepped portion st1 and the second stepped portion st2 are indicated by white arrows, respectively.

As illustrated in FIG. 4, the lens 221, spacers 41 and 42, a spring member 43, the lens 222, a spacer 44, the lens 223, a spacer 45, the lens 224, and a ring screw 46 are accommodated in the head housing 10 so as to be aligned in the +x direction in this order between the first stepped portion st1 and the front end portion FE. The spacers 41, 42, 44, and 45, the spring member 43, and the ring screw 46 are formed using the same material as that of the head housing 10.

An outer diameter of the lens 221 is larger than the inner diameter of the first inner peripheral surface 11i of the first housing section 11 and slightly smaller than the inner diameter of the second inner peripheral surface 11j of the first housing section 11. As a result, the lens 221 is fitted into second inner peripheral surface 11j of first housing section 11. In this state, a part (peripheral edge) of an end surface of the lens 221 in the −x direction abuts on the first stepped portion st1. Therefore, the lens 221 is restricted from moving in the −x direction with respect to the first stepped portion st1.

In addition, a thickness of the lens 221 (a dimension of the lens 221 in the optical axis direction) is larger than a distance between the first stepped portion st1 and the second stepped portion st2 in the x direction. As a result, a portion of the lens 221 (a portion including an end surface in the +x direction) protrudes inside the second housing section 12.

The spacer 41 is a substantially disk-shaped member having a diameter slightly smaller than the inner diameter of the third inner peripheral surface 12i. As illustrated in FIG. 5, a circular opening portion 41a having an inner diameter smaller than the outer diameter of the lens 221 is formed in a central portion of the spacer 41. In addition, two through-holes 41b are formed in the spacer 41 so as to sandwich the opening portion 41a.

As illustrated in FIG. 4, the spacer 41 is provided in the second housing section 12 so as to abut on a part (peripheral edge) of the end surface of lens 221 in the +x direction. The spacer 42 is an annular member having the same outer diameter as that of the spacer 41, and is provided in the second housing section 12 so as to abut on the spacer 41. An inner diameter of the spacer 42 is determined so as not to block the two through-holes 41b (FIG. 5) of the spacer 41 in a state where the spacer 42 abuts on the spacer 41. In this case, the two through-holes 41b (FIG. 5) of the spacer 41 function as a gas flow path for preventing formation of a sealed space between the spacer 41 and the second stepped portion st2.

Since the sealed space is not formed between the spacer 41 and the second stepped portion st2, a large variation does not occur in a pressure distribution in the head housing 10 when the measurement head 1A is arranged in the vacuum environment. This prevents the measurement head 1A from being unintentionally deformed due to the large variation in the pressure distribution.

The spacers 41 and 42 are used to position the spring member 43 at a predetermined position in the x direction inside the head housing 10. For example, at the time of assembling the measurement head 1A, the plurality of spacers 41 and 42 having a plurality of thicknesses are prepared in advance. Then, the appropriate spacer 41 or 42 is selected and used in accordance with the predetermined position of the spring member 43 in the x direction, a dimension of each unit in the head housing 10, and the dimension of the lens 221.

As illustrated in FIG. 5, the spring member 43 has a flat and substantially cylindrical shape. As illustrated in FIG. 4, the spring member 43 is provided in the second housing section 12 so as to abut on the spacer 42 with an axis of the spring member 43 along the head axis 10a. In addition, the spring member 43 also has the same or substantially the same outer diameter as those of the spacers 41 and 42. Furthermore, the spring member 43 is configured to be expandable and contractible in the axial direction of the spring member 43 by an elastic force. Details of the spring member 43 will be described later.

The lens 222 is provided in the second housing section 12 so as to abut on the spring member 43. In addition, the lens 223 is provided in the +x direction of the lens 222 with the spacer 44 interposed therebetween. Furthermore, the lens 224 is provided in the +x direction of the lens 223 with the spacer 45 interposed therebetween.

Each of the three lenses 222, 223, and 224 has the same or substantially the same outer diameter as those of the spacers 41 and 42 and the spring member 43. Each of the spacers 44 and 45 is an annular member having a constant thickness and has the same or substantially the same outer diameter as those of the spacers 41 and 42 and the spring member 43.

Threading is performed on a range of the third inner peripheral surface 12i of the second housing section 12 having a constant width in the −x direction from the front end portion FE. That is, a part of the third inner peripheral surface 12i forms a female screw portion 12j in the second housing section 12. The female screw portion 12j is formed so as to be located near the lens 224 in a state where the plurality of constituent elements (41 to 45 and 221 to 224) is accommodated in the head housing 10 so as to be in contact with each other.

The ring screw 46 is a male screw corresponding to the female screw portion 12j of the second housing section 12. The ring screw 46 is attached to the female screw portion 12j of the second housing section 12 in the state where the plurality of constituent elements (41 to 45 and 221 to 224) is accommodated in the head housing 10 so as to be in contact with each other. An inner diameter of the ring screw 46 is smaller than the outer diameter of the lens 224. Therefore, when the ring screw 46 is attached to the female screw portion 12j, a part of the ring screw 46 abuts on a part (peripheral edge) of an end surface facing the +x direction of the lens 224. In addition, the ring screw 46 is tightened such that a predetermined amount of load in the x direction acts on the spring member 43 in a state of being in contact with the lens 224.

Figure 6A:
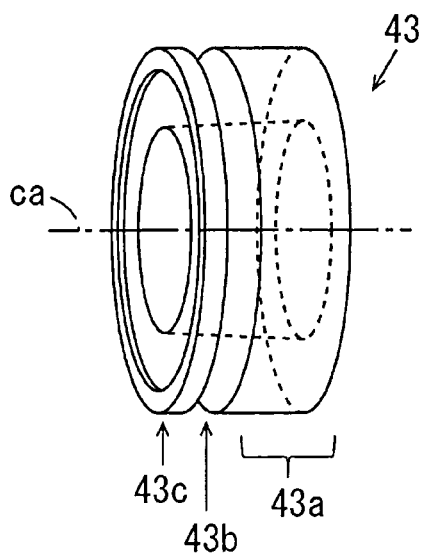
FIGS. 6A to 6C are views for describing details of a configuration and a function of a spring member accommodated in a head housing.
Figure 6B:
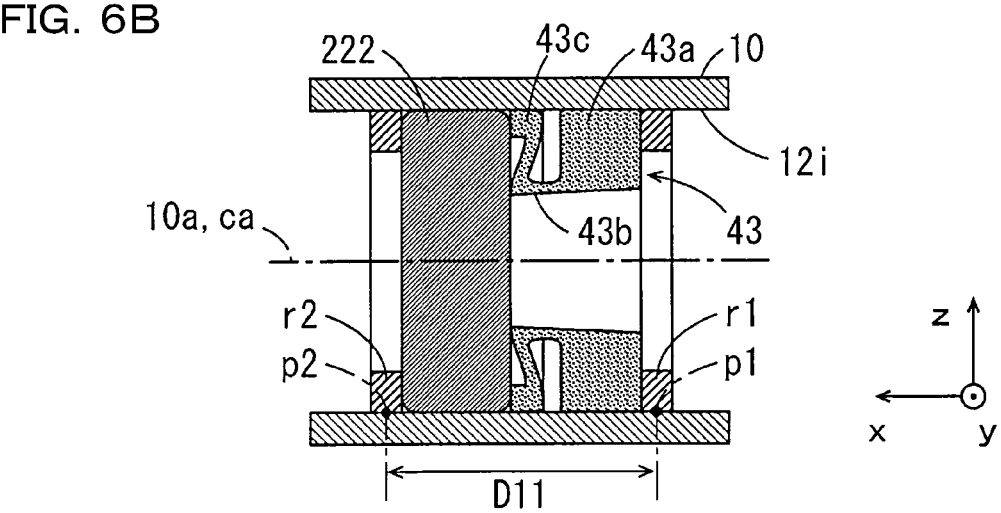
Figure 6C:
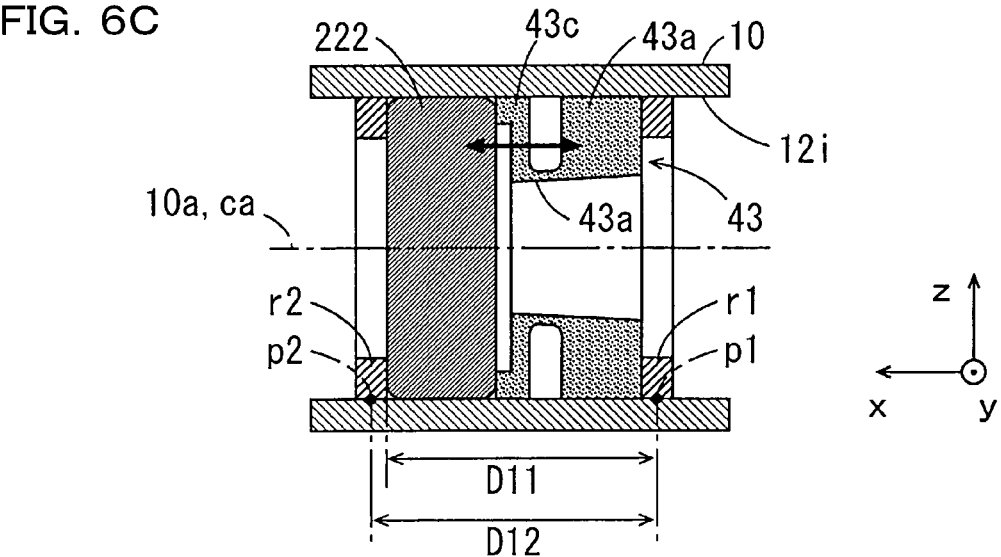

Here, a configuration and a function of the spring member 43 will be described in detail. FIGS. 6A to 6C are views for describing details of the configuration and the function of the spring member 43 accommodated in the head housing 10. As described above, the spring member 43 has a flat and substantially cylindrical shape. FIG. 6A illustrates an external perspective view of the spring member 43. The spring member 43 includes a base portion 43a, a small diameter portion 43b, and a flange portion 43c aligned in a direction of an axis ca.

The base portion 43a and the flange portion 43c have a common outer diameter slightly smaller than that of the third inner peripheral surface 12i of the second housing section 12. Meanwhile, the small diameter portion 43b has an outer diameter smaller than (an outer diameter of about ⅔ of) the outer diameter of the base portion 43a and the flange portion 43c. In addition, the base portion 43a, the small diameter portion 43b, and the flange portion 43c have substantially constant inner diameters. Furthermore, a peripheral edge of the flange portion 43c is formed so as to protrude in a direction opposite to the base portion 43a.

With such a configuration, when a load in the direction of the axis ca acts between the flange portion 43c and the base portion 43a, the small diameter portion 43b and the flange portion 43c are elastically deformed, and a length of the spring member 43 in the direction of the axis ca changes. In the following description, a state of the spring member 43 when the load in the direction of the axis ca does not act or substantially does not act on the spring member 43 is referred to as a reference state.

When thermal expansion occurs in the head housing 10 as the measurement head 1A is arranged in the high temperature environment, the plurality of lenses 221 to 224 accommodated in the head housing 10 are likely to be greatly displaced to an unintended position in an unintended posture. Therefore, in the present embodiment, the ring screw 46 is tightened such that the predetermined amount of load in the x direction acts on the spring member 43 in a state where the measurement head 1A is at room temperature (for example, 25° C.). That is, the spring member 43 is provided so as to bias the plurality of lenses 221 to 224 in the x direction by the elastic force of the spring member 43 in a room temperature environment.

FIGS. 6B and 6C illustrate a configuration example for describing the function of the spring member 43. As illustrated in FIG. 6B, for example, it is assumed that a first ring member r1 and a second ring member r2 are fixed to a first portion p1 and a second portion p2, different from each other in the x direction, in the third inner peripheral surface 12i of the head housing 10 in the room temperature environment. Furthermore, it is assumed that the spring member 43 and the lens 222 are arranged to be aligned in this order in the +x direction between the first ring member r1 and the second ring member r2.

Here, a distance D11 between the first portion p1 and the second portion p2 in the x direction is set such that the predetermined amount of load in the x direction acts on the spring member 43. In other words, the distance D11 is set such that the spring member 43 biases the lens 222 between the first portion p1 and the second portion p2 toward the second ring member r2. As a result, the spring member 43 illustrated in FIG. 6B is contracted in the x direction with respect to the reference state due to deformation of the small diameter portion 43b and the flange portion 43c.

It is assumed that the configuration including the head housing 10 in FIG. 6B is arranged in the room temperature environment to the high temperature environment. In this case, as illustrated in FIG. 6C, a distance D12 between the first portion p1 and the second portion p2 is larger than the distance D11 corresponding to the room temperature environment due to the thermal expansion of the head housing 10. At this time, the spring member 43 in the contracted state from the reference state in the room temperature environment continuously biases the lens 222 toward the second ring member r2, and presses the lens 222 against the second ring member r2. This prevents the lens 222 provided in the head housing 10 from being displaced to an unintended position in an unintended posture.

Figure 7A:
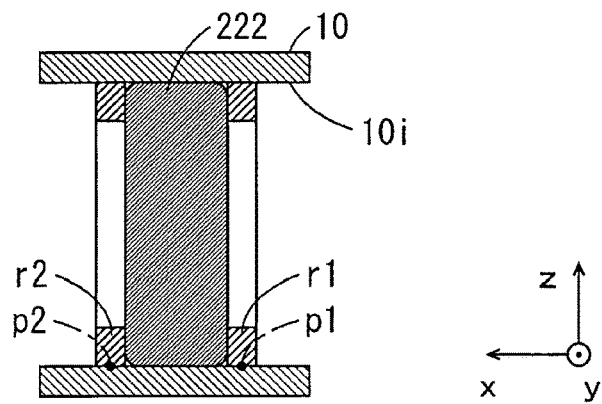
FIGS. 7A and 7B are views illustrating a reference example for describing the function of the spring member.
Figure 7B:
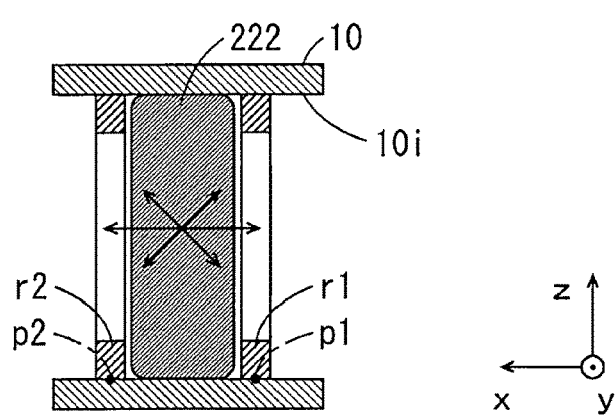

FIGS. 7A and 7B are views illustrating a reference example for describing the function of the spring member 43. As illustrated in FIG. 7A, it is assumed that the lens 222 is fixed in a state of being sandwiched between the first ring member r1 and the second ring member r2 without using the spring member 43 in the head housing 10 in the room temperature environment.

When such a configuration is arranged in the high temperature environment from the room temperature environment, a distance between the first ring member r1 and the second ring member r2 increases due to the thermal expansion of the head housing 10 as illustrated in FIG. 7B. Therefore, when a linear expansion coefficient of the lens 222 is smaller than a linear expansion coefficient of the head housing 10, a gap is generated between the lens 222 and at least one of the first ring member r1 and the second ring member r2. Accordingly, the lens 222 is likely to be displaced to an unintended position in an unintended posture.

In consideration of the above points, the spring member 43 is held in the head housing 10 in the state of being contracted in the x direction from the reference state in the room temperature environment depending on the amount of the tightened ring screw 46. In this case, the spring member 43 biases the lenses 222 to 224 toward the ring screw 46 in the +x direction. In addition, the spring member 43 biases the lens 221 toward the first stepped portion st1 in the −x direction. In this manner, the spring member 43 functions as a member that prevents the plurality of lenses 221 to 224 from being in a floating state in the head housing 10 along with a change in the temperature environment in which the measurement head 1A is arranged.

<5> Preferred Arrangement Conditions of Spring Member 43 in Head Housing 10

Figure 8:
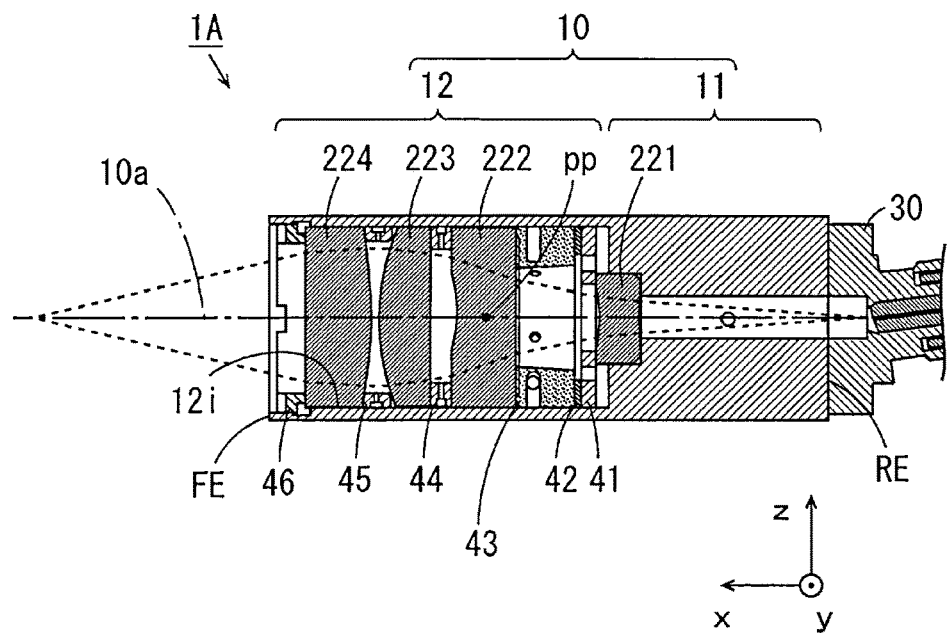
FIG. 8 is a view for describing a first arrangement condition of the spring member in the head housing.

(a) A first arrangement condition will be described as a preferred arrangement condition of the spring member 43 in the head housing 10. FIG. 8 is a view for describing the first arrangement condition of the spring member 43 in the head housing 10. In FIG. 8, an outer edge of a path of light passing through the head housing 10 is indicated by a dotted line together with the cross-sectional view of the measurement head 1A corresponding to FIG. 4. As can be seen from FIG. 8, the spring member 43 is provided such that light guided from the optical fiber 319 into the head housing 10 passes through the inner side of the spring member 43.

In the above-described measurement head 1A, the plurality of lenses 221 to 224 accommodated in the head housing 10 can be regarded as one combined optical system (hereinafter, referred to as the combined optical system). As illustrated in FIG. 8, the first arrangement condition of the spring member 43 is that the spring member 43 is arranged at a position closer to the rear end portion RE than a principal point pp defined in the combined optical system when light travels in the +x direction in the head housing 10.

In a region closer to the rear end portion RE than the principal point pp in the internal space of the head housing 10, a cross-sectional area of light traveling in the head housing 10 is gradually expanded in the +x direction from a size of the core 319a of the optical fiber 319. Therefore, in a case where the spring member 43 is provided according to the first arrangement condition, it is easy to arrange the spring member 43 so as not to interfere with the light path inside the head housing 10 even when a size of the head housing 10 is limited. In addition, the spring member 43 can be brought close to the rear end portion RE, and thus, an increase in size of the head housing 10 in the x direction is reduced.

(b) A second arrangement condition will be described as a preferred arrangement condition of the spring member 43 in the head housing 10. Some of the plurality of lenses 221 to 224 provided in the measurement head 1A have an effective diameter larger than an inner diameter of the spring member 43. Specifically, among the plurality of lenses 221 to 224, the lenses 222 to 224 have effective diameters larger than the inner diameter of the spring member 43. On the other hand, the lens 221 has an effective diameter smaller than the inner diameter of the spring member 43.

In such a configuration, the second arrangement condition of the spring member 43 is that the spring member 43 is arranged at a position closer to the rear end portion RE than the lenses 222 to 224 having the effective diameters larger than the inner diameter of the spring member 43. In a case where the spring member 43 is provided according to the second arrangement condition, it is easy to arrange the spring member 43 so as not to interfere with the light path inside the head housing 10 even when the size of the head housing 10 is limited. In addition, the spring member 43 can be brought close to the rear end portion RE, and thus, an increase in size of the head housing 10 in the x direction is reduced.

(c) A third arrangement condition will be described as a preferred arrangement condition of the spring member 43 in the head housing 10. Among the plurality of lenses 221 to 224 provided in the measurement head 1A, the lens 221 is the magnifying lens, and causes light guided from the optical fiber 319 to travel in the +x direction while expanding a cross-sectional area of the light. In this manner, a region in which the cross-sectional area of the light traveling in the +x direction is gradually expanded by at least one lens among the plurality of lenses 221 to 224 in the head housing 10 is referred to as a light expansion region. In this case, the third arrangement condition of the spring member 43 is that the spring member 43 is arranged in the light expansion region.

According to the above configuration, it is easy to arrange the spring member 43 so as not to interfere with the light path inside the head housing 10 even when the size of the head housing 10 is limited. In addition, the increase in the size of the head housing 10 in the x direction is reduced by bringing the light expansion region inside the head housing 10 close to the rear end portion RE.

<6> Adhesive

As illustrated in FIG. 5, at the time of assembling the measurement head 1A, basically, the ring screw 46 is attached from the front end portion FE in the state where the plurality of constituent elements (41 to 45 and 221 to 224) is accommodated in the head housing 10. The fiber receptacle 30 is connected to the rear end portion RE of the head housing 10 using the plurality of screws SC1.

Here, an adhesive made of an inorganic material is used to further strengthen a fixed state of a fastening portion of a screw in the measurement head 1A according to the present embodiment. The inorganic material of the adhesive is, for example, ceramic powder.

Specifically, in the present embodiment, the adhesive made of the inorganic material is applied between the ring screw 46 and the female screw portion 12j when the ring screw 46 is attached to the female screw portion 12j of the second housing section 12 as indicated by a rectangular frame ad1 in a one-dot chain line in FIG. 4. In this case, since the adhesive does not contain an organic material, generation of outgas from the adhesive is suppressed even when the measurement head 1A is arranged in the vacuum environment. Accordingly, a decrease in the degree of vacuum caused by the adhesive is suppressed.

Figure 9:
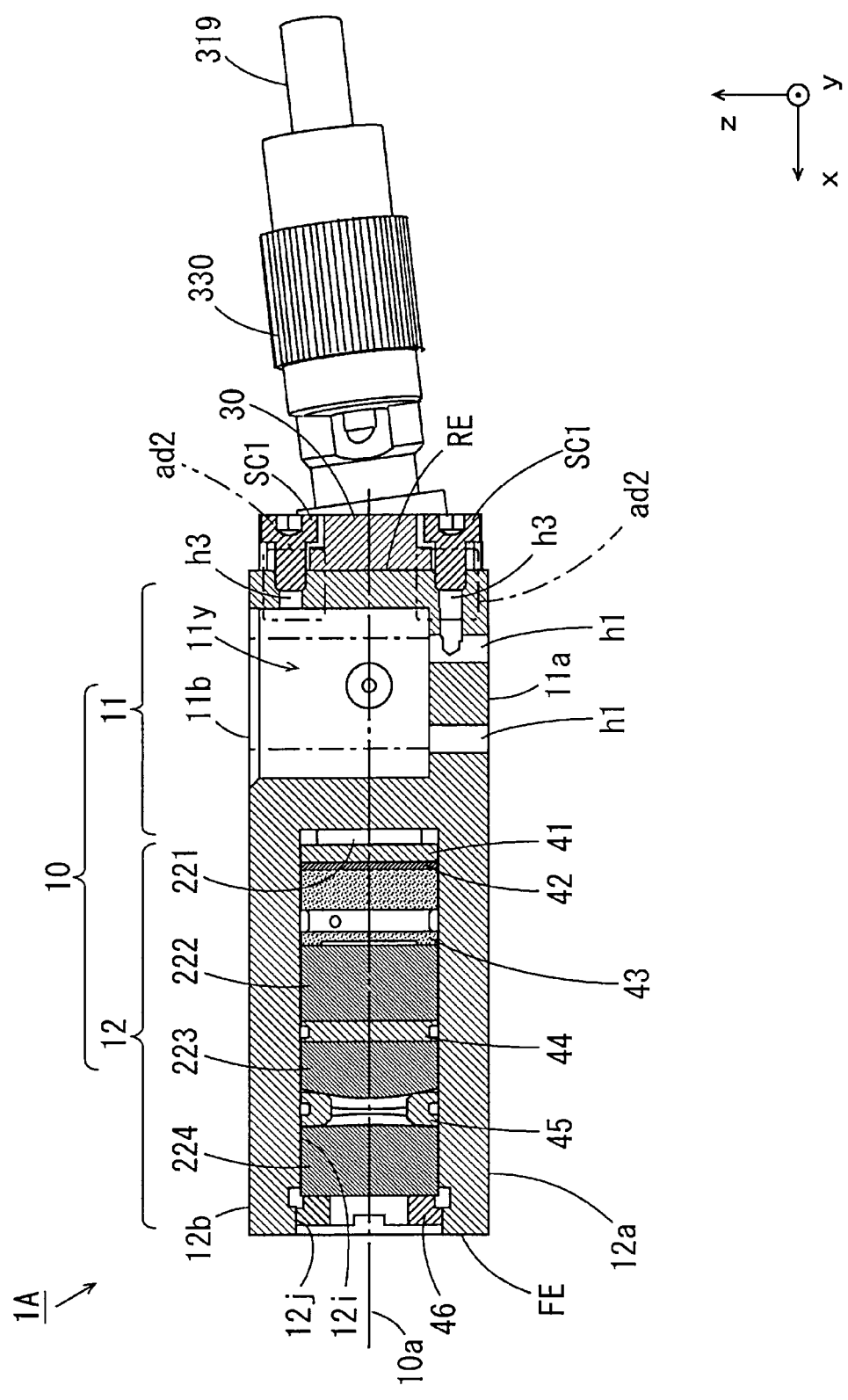
FIG. 9 is a cross-sectional view of the measurement head taken along a virtual plane indicated by two-dot chain lines in FIGS. 2 and 3.

FIG. 9 is a cross-sectional view of the measurement head 1A taken along a virtual plane VS2 indicated by two-dot chain lines in FIGS. 2 and 3. The cross-sectional view of FIG. 9 illustrates a state in which the fiber receptacle 30 is attached to the rear end portion RE of the head housing 10 using the plurality of screws SC1.

In the present embodiment, an adhesive made of an inorganic material is applied between the screw SC1 and the screw hole h3 when the fiber receptacle 30 is screwed to the head housing 10 as indicated by a rectangular frame ad2 in a one-dot chain line in FIG. 9. In this case, since the adhesive does not contain an organic material, generation of outgas from the adhesive is suppressed even when the measurement head 1A is arranged in the vacuum environment. Accordingly, a decrease in the degree of vacuum caused by the adhesive is suppressed.

When the adhesive made of the inorganic material is used for assembling the measurement head 1A as described above, the adhesive is preferably applied so as not to be exposed. As a result, powder of the inorganic material such as ceramic is suppressed from scattering around the measurement head 1A.

3. Light Bending Unit and Distance Adjustment Member

Each of the measurement heads 1A and 1B may further include a light bending unit that is detachably attached to the head housing 10 and changes a traveling direction of light emitted from the head housing 10 by a predetermined angle (90° in this example). In addition, each of the measurement heads 1A and 1B may further include a plurality of distance adjustment members that adjust a measurable range of a displacement by each of the measurement heads 1A and 1B when the light bending unit is attached.

Figure 10:
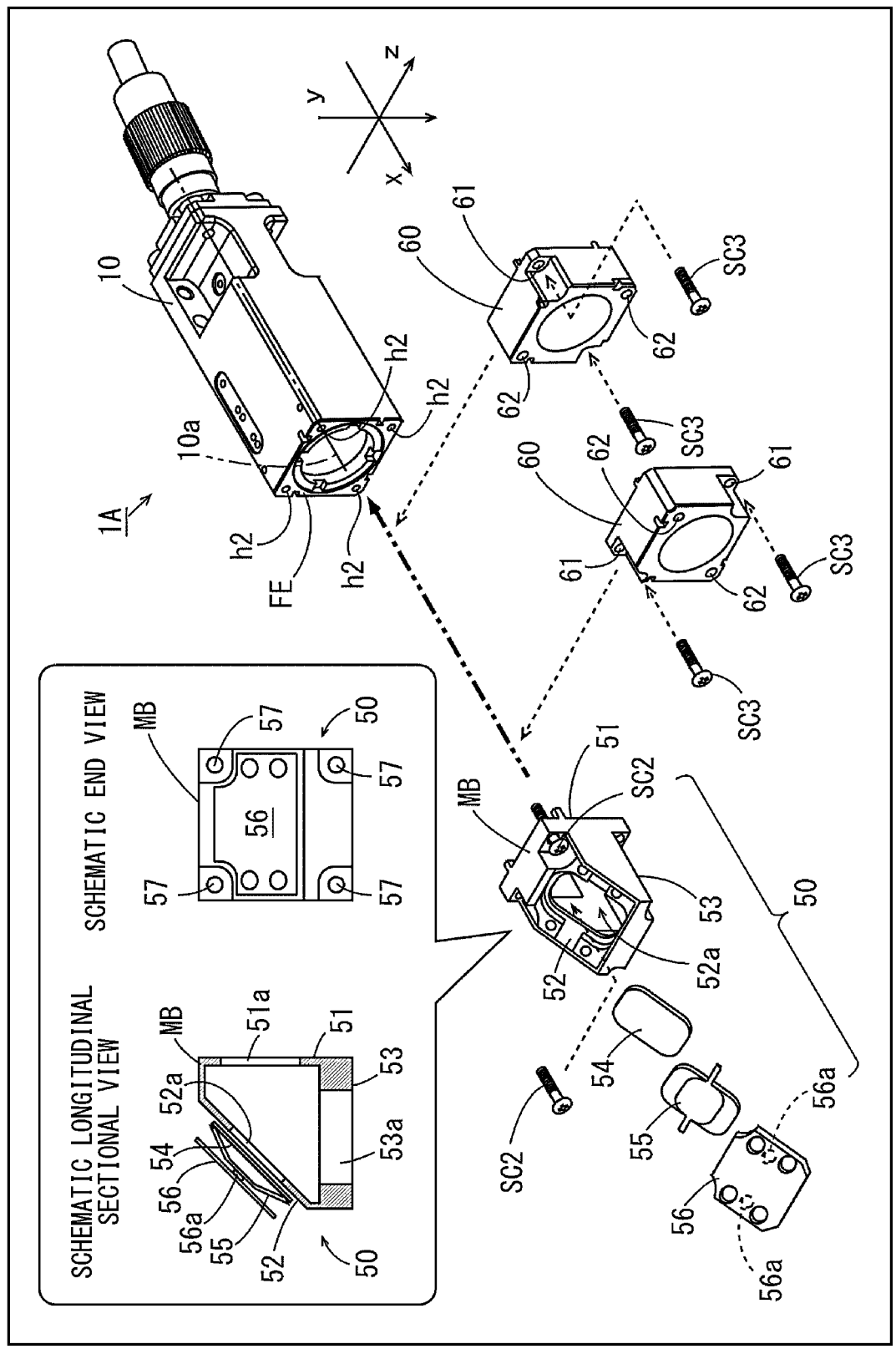
FIG. 10 is an external perspective view of a light bending unit and a plurality of distance adjustment members.

FIG. 10 is an external perspective view of the light bending unit and the plurality of distance adjustment members. FIG. 10 illustrates an exploded perspective view of the light bending unit 50 and an external perspective view of a plurality of (two in this example) distance adjustment members 60, and an external perspective view of the measurement head 1A in FIG. 2. Furthermore, in FIG. 10, a schematic longitudinal sectional view and a schematic side view of the light bending unit 50 are illustrated in a balloon.

As illustrated in FIG. 10, the light bending unit 50 includes a main body MB, a mirror 54, a leaf spring 55, and a fixed plate 56. The mirror 54 is attached to the leaf spring 55. Accordingly, the mirror 54 and the leaf spring 55 can be integrally handled at the time of assembling the light bending unit 50. Note that the external perspective view of FIG. 10 illustrates a state where the mirror 54 and the leaf spring 55 are separated from each other for easy understanding of shapes and the positional relationship of the mirror 54 and the leaf spring 55. The main body MB has a rear end surface 51, a front end inclined surface 52, and an emission surface 53. The rear end surface 51 is formed to be capable of coming into contact with the front end portion FE of the head housing 10. The front end inclined surface 52 faces the rear end surface 51 at a position of the rear end surface 51 in the +x direction, and is inclined by 45° with respect to the rear end surface 51. The emission surface 53 is orthogonal to the rear end surface 51.

In the light bending unit 50, a substantially triangular longitudinal section is formed by the rear end surface 51, the front end inclined surface 52, and the emission surface 53 as illustrated in the balloon in FIG. 10. Opening portions 51a, 52a, and 53a are formed in the rear end surface 51, the front end inclined surface 52, and the emission surface 53, respectively.

The mirror 54 is provided on the front end inclined surface 52 so as to cover the opening portion 52a. The fixed plate 56 is a plate-like member made of metal, and two protrusions 56a are formed on one surface thereof. The fixed plate 56 is attached to the front end inclined surface 52 using a screw (not illustrated) such that the leaf spring 55 is located in the +x direction with respect to the mirror 54 and the two protrusions 56a face the −x direction. Here, the leaf spring 55 is formed with two pressed portions extending in the −z direction and the +2 direction, respectively. In addition, the two protrusions 56a of the fixed plate 56 are formed so as to correspond to the two pressed portions of the leaf spring 55. Therefore, in a state where the fixed plate 56 is attached to the front end inclined surface 52, the two pressed portions of the leaf spring 55 are pressed by the two protrusions 56a of the fixed plate 56 so as to approach the mirror 54. Accordingly, the mirror 54 is held in a state of being biased toward the front end inclined surface 52 by the leaf spring 55.

In the main body MB of the light bending unit 50, four through-holes 57 respectively corresponding to the four screw holes h2 (FIG. 2) of the front end portion FE of the head housing 10 are formed. Accordingly, the light bending unit 50 can be easily attached to the head housing 10 by inserting the four screws SC2 into the four screw holes h2 of the head housing 10 through the four through-holes 57 of the main body MB and tightening the respective screws SC2.

Note that the light bending unit 50 may be attached to the head housing 10 using two or three screws SC2. For example, two screws SC2 are inserted into two screw holes h2 of the head housing 10 diagonally arranged across the head axis 10a through the two through-holes 57 of the light bending unit 50. As a result, the light bending unit 50 may be attached to the head housing 10.

In a state where the light bending unit 50 is attached to the head housing 10, light emitted from the inside of the head housing 10 through the opening portion of the front end portion FE is incident on the mirror 54 through the opening portions 51a and 52a of the main body MB. Therefore, the light incident on the mirror 54 is reflected by the mirror 54 to be bent by 90°, and travels toward the lateral side of the measurement head 1A (in a direction orthogonal to the head axis 10a) through the opening portion 53a of the main body MB. As a result, according to the light bending unit 50 in FIG. 10, a measurement direction of the measurement object S with respect to a posture of the head housing 10 can be changed by 90°.

A range (hereinafter, referred to as a measurement range) in which a displacement of the measurement object S can be measured from the front end portion FE of the head housing 10 in the measurement head 1A is determined by the lens 221 to 224 accommodated in the head housing 10. Therefore, the measurement range from the emission surface 53 of the light bending unit 50 when the light bending unit 50 is attached to the head housing 10 can be appropriately changed by adjusting a distance between the head housing 10 and the light bending unit 50. Therefore, the plurality of distance adjustment members 60 are used.

Each of the plurality of distance adjustment members 60 has a rear end surface and a front end surface. The rear end surface and the front end surface have a substantially rectangular shape (in this example, a substantially square shape) corresponding to the front end portion FE of the head housing 10. The rear end surface of the distance adjustment member 60 is formed to be capable of coming into contact with the front end portion FE of the head housing 10. The front end surface of the distance adjustment member 60 is formed to be capable of coming into contact with the rear end surface 51 of the light bending unit 50.

An opening through which light emitted from the head housing 10 passes is formed in a central portion of the distance adjustment member 60 from the front end surface to the rear end surface. In addition, two through-holes 61 and two screw holes 62 are formed at four corners of the front end surface of the distance adjustment member 60 as viewed in the x direction so as to surround the opening in the central portion. The two through-holes 61 are located at diagonal positions on one side across the opening in the central portion, and the two screw holes 62 are located at diagonal positions on the other side across the opening in the central portion.

The two through-holes 61 of one distance adjustment member 60 are used to insert two screws SC3 into two screw holes h2 of the head housing 10 through the two through-holes 61 and screw the one distance adjustment member 60 to the head housing 10. Alternatively, the two through-holes 61 of one distance adjustment member 60 are used to insert the two screws SC3 into the two screw holes 62 of the other distance adjustment member 60 through the two through-holes 61 and screw the one distance adjustment member 60 to the other distance adjustment member 60.

The two screw holes 62 of one distance adjustment member 60 are used to screw the other distance adjustment member 60 onto the front end surface of the one distance adjustment member 60 with the two screws SC3 as described above. Alternatively, the two screw holes 62 of one distance adjustment member 60 are used to screw the light bending unit 50 to the one distance adjustment member 60 by inserting the two screws SC2 through the two through-holes 57 of the light bending unit 50.

As described above, the distance adjustment members 60 can be inserted between the head housing 10 and the light bending unit 50 when the light bending unit 50 is attached to the head housing 10.

Figure 11A:
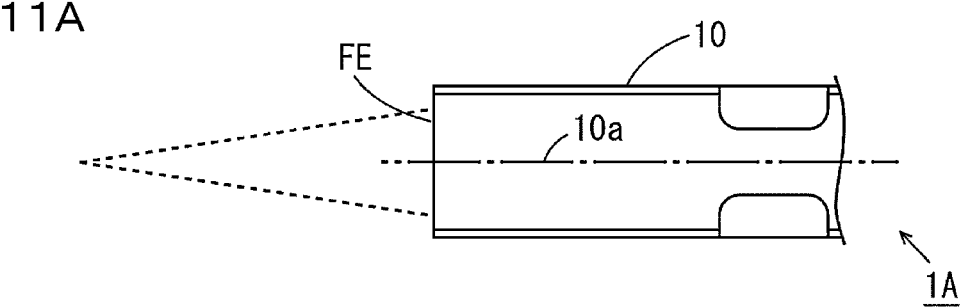
FIGS. 11A to 11D are views illustrating changes in a measurement direction and a measurable range of the measurement head by the light bending unit and the plurality of distance adjustment members in FIG. 10.

FIGS. 11A to 11D are views illustrating changes in a measurement direction and a measurable range of the measurement head 1A by the light bending unit 50 and the plurality of distance adjustment members 60 in FIG. 10. In FIG. 11A, a path of light having one wavelength (hereinafter, referred to as specific wavelength light) emitted from the head housing 10 in a state where the light bending unit 50 and the plurality of distance adjustment members 60 are not attached is indicated by a dotted line. According to the example of FIG. 11A, the specific wavelength light emitted from the head housing 10 travels along the head axis 10a. Therefore, a displacement measurement direction coincides with the direction of the head axis 10a.

Figure 11B:
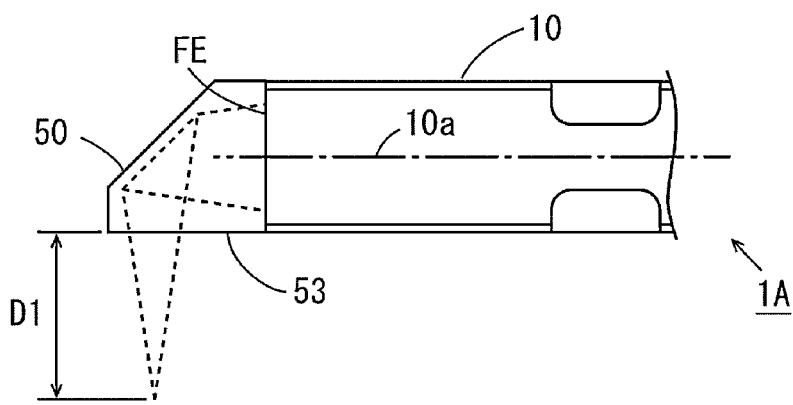

In FIG. 11B, a path of specific wavelength light emitted from the head housing 10 in a state where the light bending unit 50 is attached is indicated by a dotted line. According to the example of FIG. 11B, the specific wavelength light emitted from the head housing 10 travels in a direction bent by 90° from the head axis 10a by the light bending unit 50. Therefore, a displacement measurement direction is orthogonal to the head axis 10a. In addition, in the example of FIG. 11B, the specific wavelength light emitted from the emission surface 53 of the light bending unit 50 is focused at a position separated by a distance D1.

Figure 11C:
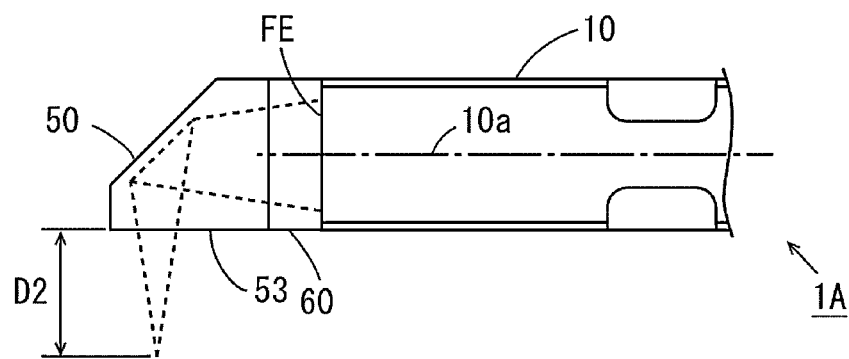

In FIG. 11C, a path of specific wavelength light emitted from the head housing 10 in a state where the light bending unit 50 and one distance adjustment member 60 are attached is indicated by a dotted line. According to the example of FIG. 11C, the specific wavelength light emitted from the emission surface 53 of the light bending unit 50 is focused at a position separated by a distance D2 shorter than the distance D1 in FIG. 11B.

Figure 11D:
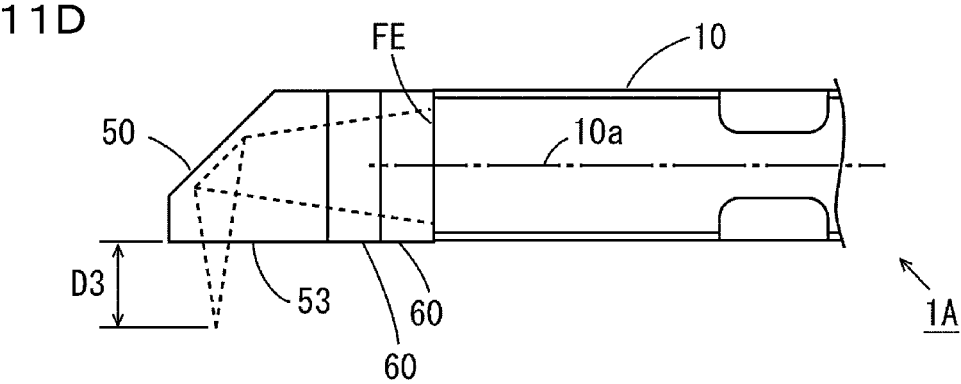

In FIG. 11D, a path of specific wavelength light emitted from the head housing 10 in a state where the light bending unit 50 and two distance adjustment member 60 are attached is indicated by a dotted line. According to the example of FIG. 11D, the specific wavelength light emitted from the emission surface 53 of the light bending unit 50 is focused at a position separated by a distance D3 shorter than the distance D2 in FIG. 11C.

In this manner, according to the light bending unit 50 and the plurality of distance adjustment members 60, the degree of freedom in a position and a posture of the measurement head 1A at the time of measuring a displacement of the measurement object S is increased.

Note that, in the above-described light bending unit 50, a mirror in which aluminum is vapor-deposited on one surface of glass is used as the mirror 54. Accordingly, all constituent elements of the light bending unit 50 are formed using metal or glass. In addition, the distance adjustment member 60 is configured using the same single member made of metal as that of the head housing 10. In these cases, the light bending unit 50 and the plurality of distance adjustment members 60 do not contain any organic substance. Therefore, even in a case where the measurement head 1A is arranged in the vacuum environment in a state where any one of the light bending unit 50 and the plurality of distance adjustment members 60 is attached to the head housing 10, generation of outgas from the measurement head 1A is prevented. In addition, a decrease in the degree of vacuum caused by the light bending unit 50 and the plurality of distance adjustment members 60 is suppressed.

4. Effects (a) The plurality of lenses 221, 222, 223, and 224 are accommodated in the head housing 10 of each of the measurement heads 1A and 1B so as to be aligned between the first stepped portion st1 and the ring screw 46. The spring member 43 is provided between the two lenses 221 and 222.

The movement of the lens 224 in the +x direction is restricted by abutting on the ring screw 46. In this state, the lenses 222, 223, and 224 are biased in the +x direction by the spring member 43. On the other hand, the movement of the lens 221 in the −x direction is restricted by abutting on the first stepped portion st1. In this state, the lens 221 is biased in the −x direction by the spring member 43.

According to this configuration, even when dimensions of the respective constituent elements of the measurement heads 1A and 1B change due to thermal expansion as the measurement heads 1A and 1B are arranged in the high temperature environment, each of the plurality of lenses 221 to 224 is biased toward a direction in which the movement is restricted. Accordingly, each of the lenses 221 to 224 is fixed to a predetermined portion inside the head housing 10 and is not in the floating state. Therefore, each lens is prevented from being greatly displaced to an unintended position in an unintended posture every time the measurement heads 1A and 1B are arranged in the high temperature environment.

In addition, the head housing 10, the spacers 41, 42, 44, and 45, the spring member 43, the ring screw 46, and the fiber receptacle 30 are made of the same metal material in the above-described measurement heads 1A and 1B. Furthermore, the plurality of lenses 221 to 224 are formed using glass. As a result, the heat resistance of the measurement heads 1A and 1B is improved as compared with a case where any of the head housing 10, the spacers 41, 42, 44, and 45, the spring member 43, the ring screw 46, the fiber receptacle 30, and the plurality of lenses 221 to 224 is formed using an organic material such as a resin. In addition, the degree of deformation of a member formed using metal and glass due to a temperature change is more easily grasped as compared with that using a resin. Therefore, it is easy to correct a measurement value in consideration of the temperature change.

As a result, it is possible to suppress a decrease in reliability of measurement in the high temperature environment of the confocal displacement sensor 9 according to the measurement heads 1A and 1B of the present embodiment.

(b) In addition, one spring member 43 is used as a common member for biasing the four lenses 221 to 224 in the present embodiment as described above. As a result, an increase in the number of components and an increase in size of the measurement heads 1A and 1B are suppressed as compared with a case where four biasing members are individually provided to bias the four lenses 221 to 224, respectively.

(c) Furthermore, the materials of the respective constituent elements of the measurement heads 1A and 1B basically do not contain any organic material according to the above configuration. Accordingly, even when the measurement heads 1A and 1B are arranged in the vacuum environment, outgas is less likely to be generated from the measurement heads 1A and 1B. Therefore, a decrease in the degree of vacuum in the vacuum environment caused by outgas from the measurement heads 1A and 1B is suppressed when the measurement heads 1A and 1B are arranged in the vacuum environment. Therefore, a decrease in reliability of measurement in the vacuum environment of the confocal displacement sensor 9 is also suppressed.

(d) In the head housing 10, the notches 11x and 11y are formed in the first housing section 11, and the plurality of through-holes h1 for attaching the measurement heads 1A and 1B to desired portions are formed.

In the measurement heads 1A and 1B, a cross section of light traveling inside the first housing section 11 is smaller than a cross section of light traveling inside the second housing section 12. Accordingly, the increase in size of the measurement heads 1A and 1B is suppressed as compared with a case where a structure for attaching the measurement heads 1A and 1B to desired portions is provided in the second housing section 12.

(e) In the measurement heads 1A and 1B, the head housing 10, the spacers 41, 42, 44, and 45, the spring member 43, the ring screw 46, and the fiber receptacle 30 are made of stainless steel (SUS 304, SUS 316, SUS 316L, or SUS 303). The stainless steel is extremely less likely to generate outgas in a vacuum environment. As a result, even when the measurement heads 1A and 1B are arranged in the vacuum environment, outgas is less likely to be generated from the measurement heads 1A and 1B. Therefore, when the measurement heads 1A and 1B are arranged in the vacuum environment, a decrease in the degree of vacuum caused by the constituent members of the measurement heads 1A and 1B is suppressed.

5. Other Embodiments (a) In each of the measurement heads 1A and 1B according to the above embodiment, the spring member 43 is accommodated in the head housing 10 in order to bias each of the plurality of lenses 221 to 224 in the x direction, but the invention is not limited thereto.

Figure 12:
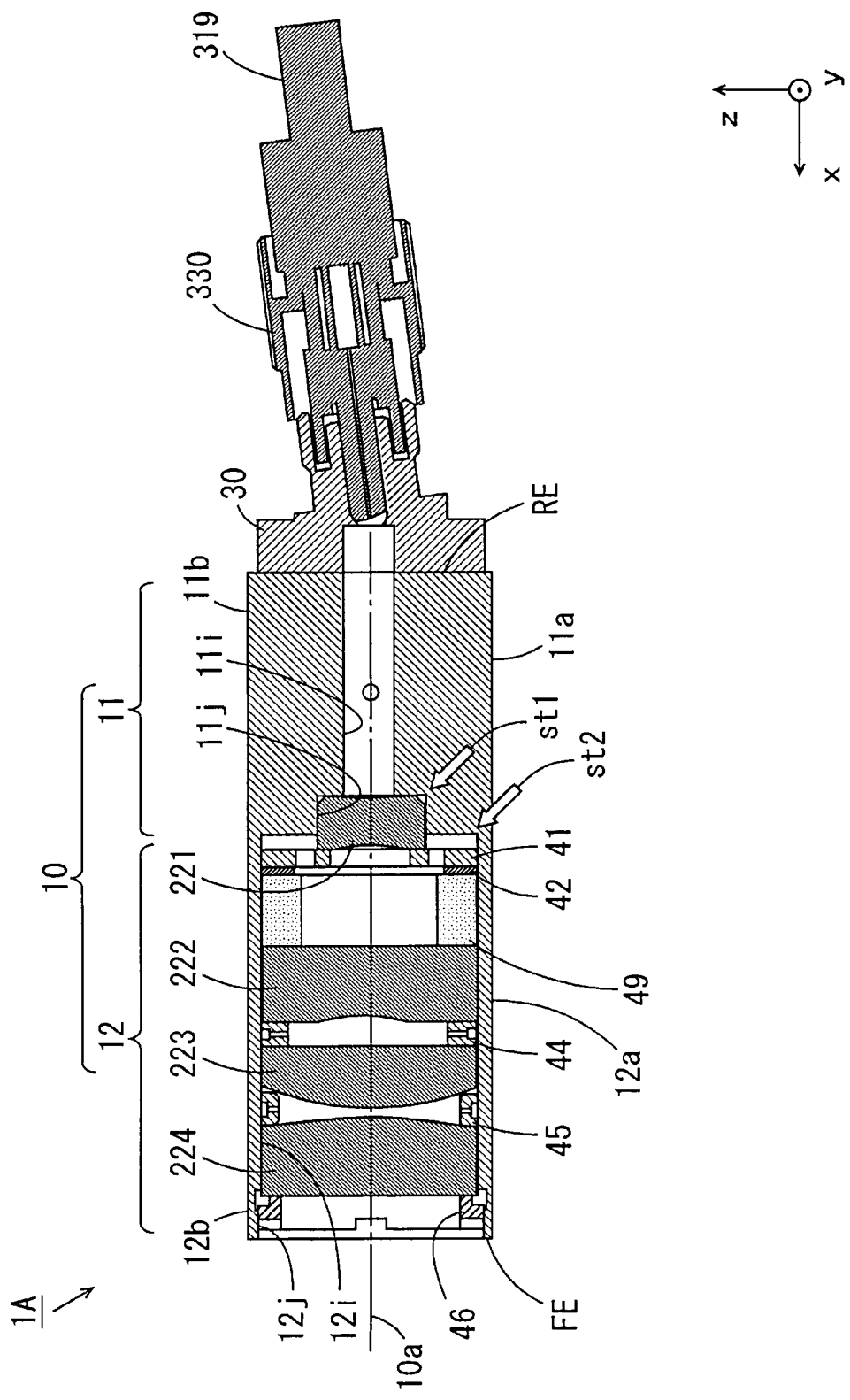
FIG. 12 is a cross-sectional view illustrating an example of a measurement head according to another embodiment.

FIG. 12 is a cross-sectional view illustrating an example of the measurement head 1A according to another embodiment. The cross-sectional view of FIG. 12 corresponds to the cross-sectional view of FIG. 4 of the above embodiment. Hereinafter, differences of the measurement head 1A in FIG. 12 from the measurement head 1A according to the above embodiment will be described.

In the measurement head 1A in FIG. 12, a thermal expansion member 49 having a substantially cylindrical shape is provided in the head housing 10 instead of the spring member 43 according to the above embodiment. The thermal expansion member 49 is made of a polyimide resin having relatively high heat resistance.

The thermal expansion member 49 is provided such that an axis of the thermal expansion member 49 extends in the x direction. in a room temperature environment, both end portions of the thermal expansion member 49 in the x direction are in contact with a part of the spacer 42 and a part of the lens 222, respectively.

A linear expansion coefficient of polyimide is larger than a linear expansion coefficient of metal. Therefore, in the above-described measurement head 1A, when dimensions of the respective constituent elements of the measurement heads 1A change due to thermal expansion, the thermal expansion member 49 expands more than the plurality of lenses 221 to 224 and the head housing 10. As a result, when the measurement head 1A is arranged in a high temperature environment, each of the plurality of lenses 221 to 224 is biased in a direction in which movement is restricted by the expanding thermal expansion member 49. Accordingly, each of the lenses 221 to 224 is fixed to a predetermined portion inside the head housing 10 and is not in a floating state as in the example of the above embodiment. Therefore, each lens is prevented from being greatly displaced to an unintended position in an unintended posture every time the measurement heads 1A is arranged in the high temperature environment.

As a result, it is possible to suppress a decrease in reliability of measurement in the high temperature environment of the confocal displacement sensor 9 by using polyimide having high heat resistance as the polyimide used for the thermal expansion member.

(b) Although the four lenses 221 to 224 are provided in the head housing 10 according to the above embodiment, the invention is not limited thereto. As long as a displacement of the measurement object S can be measured, only two lenses, only three lenses, or five or more lenses may be provided in the head housing 10.

(c) Although one spring member 43 is used as the member that biases the plurality of lenses 221 to 224 in the x direction in the measurement heads 1A and 1B according to the above embodiment, the invention is not limited thereto. A plurality of spring members may be provided in the head housing 10 so as to correspond to the plurality of lenses 221 to 224, respectively, and each lens may be biased in the x direction by the corresponding spring member.

(d) Although the first stepped portion st1 in the head housing 10 restricts the movement of the lens 221 in the −x direction in the measurement heads 1A and 1B according to the above embodiment, the invention is not limited thereto. As a configuration for restricting the movement of the lens 221 in the −x direction, a configuration using a ring screw may be adopted. In this case, the first stepped portion st1 and the second stepped portion st2 are not necessarily formed inside the head housing 10. In addition, it suffices that the lens 221 is formed so as to abut on the ring screw and not to pass through the inside of the ring screw. Therefore, it suffices that the lens 221 has an outer shape larger than an inner diameter of the ring screw, and may have the same outer diameter as that of the other lenses 222, 223, and 224.

(e) Although each of the spacers 41, 42, 44, and 45 is provided between two lenses of the plurality of lenses 221 to 224 accommodated in the head housing 10 in the measurement heads 1A and 1B according to the above embodiment, the invention is not limited thereto. The spacer is not necessarily provided between any two lenses of the plurality of lenses 221 to 224.

(f) In the measurement heads 1A and 1B according to the above embodiment, the spring member 43 may be provided at a position in the +x direction with respect to the plurality of lenses (221 to 224) in the head housing 10, or may be provided at a position in the −x direction with respect to the plurality of lenses (221 to 224).

6. Correspondence Relationship Between Each Constituent Element of Claims and Each Unit of Embodiments Hereinafter, an example of the correspondence between each constituent element of the claims and each unit of the embodiments will be described, but the invention is not limited to the following example. Various other elements having the configurations or functions described in the claims can be used as the respective constituent elements of the claims.

In the above embodiments, the white light source included in the light projecting unit 120 is an example of a white light source, the confocal displacement sensor 9 is an example of a confocal displacement sensor, the measurement heads 1A and 1B are examples of a measurement head, the rear end portion RE of the head housing 10 is an example of a first end portion, the front end portion FE of the head housing 10 is an example of a second end portion, the head housing 10 is an example of a housing, and the optical fibers 319 of the light guiding units 300A and 300B are examples of an optical fiber.

In addition, the lens 224 is an example of a first lens, the head axis 10a is an example of an axis of the housing, the lenses 221 to 224 are examples of a plurality of lenses, the female screw portion 12j of the third inner peripheral surface 12i is an example of a first portion, the +x direction is an example of a first direction, the −x direction is an example of a second direction, the ring screw 46 is an example of a first movement restricting portion and a restricting member, and the spring member 43 is an example of a biasing member.

In addition, the spacers 41, 42, 44, and 45 are examples of one or more spacers, the lens 221 is an example of a second lens, the first stepped portion st1 in the head housing 10 is an example of a second portion and a second movement restricting portion, the third inner peripheral surface 12i of the second housing section 12 is an example of an inner peripheral surface of the housing, the principal point pp of the combined optical system is an example of a principal point, and the outer surfaces 11a, 11b, 11c, 11d, 12a, 12b, 12c, and 12d are examples of an outer surface.

In addition, the first housing section 11 is an example of a first housing section, the second housing section 12 is an example of a second housing section, the first inner peripheral surface 11i, the second inner peripheral surface 11j, and the third inner peripheral surface 12i are examples of an inner peripheral surface of the housing, a portion where the plurality of through-holes h1 are formed in the first housing section 11 is an example of an attachment portion, the light bending unit 50 is an example of a light bending unit, and the distance adjustment member 60 is an example of a distance adjustment member.

In addition, the fiber receptacle 30 is an example of a fiber connection member, the screw SC1 is an example of a screw, the thermal expansion member 49 is an example of a thermal expansion member, and the measurement units 100A and 100B are examples of a displacement measurement unit.

7. Summary of Embodiments (Item 1) A measurement head according to Item 1 is a measurement head for a confocal displacement sensor having a white light source, and includes:

- a housing that is made of metal, is formed in a tubular shape, and has a first end portion and a second end portion;
- an optical fiber that is connected to the first end portion of the housing and guides light generated from the white light source to the first end portion of the housing;
- a plurality of lenses that is made of glass, includes a first lens, is accommodated inside the housing to be aligned in an axial direction of the housing and to be movable in the axial direction, and converges the light guided to the first end portion by the optical fiber on a measurement object through the second end portion while generating a chromatic aberration along an optical axis;
- a first movement restricting portion that is provided in a predetermined first portion inside the housing and restricts movement of the first lens in any one direction of a first direction from the first end portion toward the second end portion in the axial direction and a second direction opposite to the first direction, when the first lens abuts on the first movement restricting portion; and
- a biasing member that is made of metal and biases some or all of the plurality of lenses including the first lens by an elastic force in the one direction in a state where the first lens abuts on the first movement restricting portion.

In the measurement head, the plurality of lenses including the first lens are accommodated in the tubular housing so as to be aligned. The first lens is restricted from moving in any one direction of the first direction and the second direction by abutting on the first movement restricting portion. Some or all of the plurality of lenses including the first lens are biased in the one direction by the biasing member in the state where the first lens abuts on the first movement restricting portion.

In this case, even when dimensions of the respective constituent elements of the measurement head change due to thermal expansion when the measurement head is arranged in a high temperature environment, some or all of the plurality of lenses including the first lens are restricted from moving in the one direction. That is, each lens biased by the biasing member is fixed to a predetermined portion inside the housing and is not in a floating state. Therefore, each lens is prevented from being greatly displaced to an unintended position in an unintended posture every time the measurement head is arranged in the high temperature environment.

In addition, in the measurement head, the housing and the biasing member are made of metal, and the plurality of lenses is made of glass. As a result, the heat resistance of the measurement head is improved as compared with a case where any of the housing, the biasing member, and the plurality of lenses is formed using an organic material. In addition, the degree of deformation of a member formed using metal and glass due to a temperature change is more easily grasped as compared with that using a resin. Therefore, it is easy to correct a measurement value in consideration of the temperature change.

As a result, it is possible to suppress a decrease in reliability of measurement in the high-temperature environment of the confocal displacement sensor.

Furthermore, since the housing and the biasing member are formed using metal and the plurality of lenses is formed using glass according to the above configuration, outgas is less likely to be generated from the housing, the biasing member, and the lenses even when the measurement head is arranged in a vacuum environment. Therefore, when the measurement head is arranged in the vacuum environment, a decrease in the degree of vacuum in the vacuum environment due to the housing, the biasing member, and the lenses is suppressed. Therefore, it is also possible to suppress a decrease in reliability of measurement in a vacuum environment of the confocal displacement sensor.

(Item 2) In the measurement head according to Item 1, the measurement head may further include

- one or more spacers made of metal and accommodated inside the housing to be movable in the axial direction of the housing, and
- each of the one or more spacers may be provided between two lenses adjacent in the axial direction among the plurality of lenses.

In this case, the heat resistance of the measurement head is improved as compared with a case where the spacer is formed using an organic material. In addition, even when the measurement head is arranged in a vacuum environment, generation of outgas from the spacer is prevented, and a decrease in the degree of vacuum caused by the spacer is suppressed.

(Item 3) In the measurement head according to Item 1 or 2,

- the first movement restricting portion may abut on the first lens to restrict the first lens from moving in the first direction,
- the plurality of lenses may include a second lens arranged between the first lens and the second end portion in the housing,
- the measurement head may further include a second movement restricting portion that is provided in a second portion, which is located between the first portion and the second end portion inside the housing, and that abuts on the second lens among the plurality of lenses to restrict the second lens from moving in the second direction, and
- the biasing member may
  - be provided between the first lens and the second lens in the housing, and
  - bias some lenses including the first lens among the plurality of lenses in the first direction by an elastic force, and bias remaining lenses including the second lens among the plurality of lenses in the second direction by an elastic force in a state where the first lens abuts on the first movement restricting portion and the second lens abuts on the second movement restricting portion.

In this case, even when dimensions of the respective constituent elements of the measurement head change due to thermal expansion when the measurement head is arranged in a high temperature environment, some lenses including the first lens are restricted from moving in the first direction.

In addition, the remaining lenses including the second lens among the plurality of lenses are restricted from moving in the second direction. Therefore, all of the plurality of lenses is fixed to a predetermined portion inside the housing, and are not in a floating state. Therefore, each of all the lenses is prevented from being greatly displaced to an unintended position in an unintended posture every time the measurement head is arranged in the high temperature environment.

In addition, since the biasing member is arranged between some lenses including the first lens and the remaining lenses including the second lens in the above configuration, it is not necessary to individually prepare a plurality of biasing members to bias the plurality of lenses. Therefore, an increase in the number of components and an increase in size of the measurement head are suppressed.

(Item 4) In the measurement head according to any one of Items 1 to 3,
  the housing may have a cylindrical inner peripheral surface extending in the axial direction,
  the biasing member may be formed in a tubular shape extending a certain distance in the axial direction of the housing, and be arranged at a position closer to the first end portion than a principal point, which is defined in an optical system in which the plurality of lenses is combined, when light travels in the first direction in the housing, and
  the light traveling in the housing may pass through an inner side of the biasing member.

In at least a part of a region closer to the first end portion than the principal point inside the housing, a cross-sectional area of the light traveling inside the housing from the first end portion is gradually expanded in the first direction from a size of the optical fiber. Therefore, according to the above configuration, it is easy to arrange the biasing member so as not to interfere with a path of the light inside the housing even when a size of the housing is limited. In addition, since the biasing member can be brought close to the first end portion, an increase in size of the housing in the axial direction is reduced.

(Item 5) In the measurement head according to any one of Items 1 to 4,
  the housing may have a cylindrical inner peripheral surface extending in the axial direction,
  the biasing member may be formed in a tubular shape extending a certain distance in the axial direction of the housing,
  some of the plurality of lenses may have an effective diameter larger than an inner diameter of the biasing member,
  the biasing member may be arranged at a position closer to the first end portion than the some of the plurality of lenses inside the housing, and
  the light traveling in the housing may pass through an inner side of the biasing member.

According to the above configuration, it is easy to arrange the biasing member so as not to interfere with the path of the light inside the housing even when a size of the housing is limited. In addition, since the biasing member can be brought close to the first end portion, an increase in size of the housing in the axial direction is reduced.

(Item 6) In the measurement head according to Item 3,
  the housing may have a cylindrical inner peripheral surface extending in the axial direction,
  the plurality of lenses may be arranged to allow the light guided to the first end portion to travel in the first direction while expanding a cross-sectional area of the light in a partial region inside the housing,
  the biasing member may be formed in a tubular shape extending a certain distance in the axial direction of the housing, and be arranged in the partial region in the housing, and
  the light traveling in the housing may pass through an inner side of the biasing member.

According to the above configuration, it is easy to arrange the biasing member so as not to interfere with the path of the light inside the housing even when a size of the housing is limited. In addition, since the partial region inside the housing is brought close to the first end portion, an increase in size of the housing in the axial direction is reduced.

(Item 7) in the measurement head according to any one of Items 1 to 6, at least a part of the housing may have a rectangular tube-shaped outer surface extending in the axial direction and having a rectangular cross section.

In this case, the measurement head is easily installed on a predetermined installation surface as compared with a case where the housing has a cylindrical outer peripheral surface.

(Item 8) In the measurement head according to any one of Items 1 to 3,
  the housing may
    include a first housing section and a second housing section that are sequentially aligned in the first direction, and
    have an inner peripheral surface having a cylindrical shape and extending in the axial direction from the first housing section to the second housing section,
  an inner diameter of the inner peripheral surface in the first housing section may be smaller than an inner diameter of the inner peripheral surface in the second housing section,
  the plurality of lenses may be accommodated in the second housing section, and
  an attachment portion configured to attach the measurement head to another member may be formed on an outer surface of the first housing section.

In this case, it is possible to suppress an increase in size of the measurement head as compared with a case where the attachment portion is provided in the second housing section.

(Item 9) In the measurement head according to any one of Items 1 to 8,
  the measurement head may further include a light bending unit that is configured to be detachably attached to the second end portion and bends light emitted from the second end portion in a predetermined direction intersecting the axial direction.

In this case, the degree of freedom in a position and a posture of the measurement head at the time of measuring a displacement of the measurement object is increased.

(Item 10) In the measurement head according to Item 9, the measurement head may further include one or more distance adjustment members configured to be detachably attached between the second end portion and the light bending unit and adjust a distance between the measurement head and the light bending unit.

In this case, the degree of freedom in a position and a posture of the measurement head at the time of measuring a displacement of the measurement object is increased.

(Item 11) In the measurement head according to any one of Items 1 to 10, the metal forming the housing and the biasing member may be stainless steel.

In this case, even when the measurement head is arranged in a vacuum environment, outgas is less likely to be generated from the housing and the biasing member. Therefore, a decrease in the degree of vacuum caused by the housing and the biasing member is suppressed.

(Item 12) In the measurement head according to any one of Items 1 to 11, the first movement restricting portion may be configured by connecting a restricting member separate from the housing to the first portion inside the housing, and an adhesive made of an inorganic material may be used for a connecting portion between the housing and the restricting member.

In this case, even when the measurement head is arranged in a vacuum environment, a decrease in the degree of vacuum caused by the adhesive is suppressed.

(Item 13) In the measurement head according to any one of Items 1 to 12, the measurement head may further include a fiber connection member configured to connect the optical fiber to the first end portion of the housing, the fiber connection member may be connected to the first end portion of the housing using one or more screws, and an adhesive made of an inorganic material may be used for a fastening portion of each of the one or more screws.

In this case, even when the measurement head is arranged in a vacuum environment, a decrease in the degree of vacuum caused by the adhesive is suppressed.

(Item 14) A measurement head according to Item 14 is a measurement head for a confocal displacement sensor having a white light source, and includes:

a housing that is made of metal, is formed in a tubular shape, and has a first end portion and a second end portion;

an optical fiber that is connected to the first end portion of the housing and guides light generated from the white light source to the first end portion of the housing;

a plurality of lenses that is made of glass, includes a first lens, is accommodated inside the housing to be aligned in an axial direction of the housing and to be movable in the axial direction, and converges the light guided to the first end portion by the optical fiber on a measurement object through the second end portion while generating a chromatic aberration along an optical axis;

a first movement restricting portion that is provided in a predetermined first portion inside the housing and restricts movement of the first lens in any one direction of a first direction from the first end portion toward the second end portion in the axial direction and a second direction opposite to the first direction, when the first lens abuts on the first movement restricting portion; and a thermal expansion member that is made of polyimide and is provided at a position separated from the first movement restricting portion in the axial direction inside the housing, some or all of the plurality of lenses including the first lens being held between the first movement restricting portion and the thermal expansion member in a state where the first lens abuts on the first movement restricting portion.

A linear expansion coefficient of polyimide is larger than a linear expansion coefficient of metal. Therefore, in the measurement head, when dimensions of the respective constituent elements of the measurement head change due to thermal expansion, the thermal expansion member expands more than the plurality of lenses and the housing. As a result, when the measurement head is arranged in a high temperature environment from a room temperature environment, some or all of the plurality of lenses including the first lens are biased in the one direction by the thermal expansion member and is restricted from moving in the one direction. Therefore, each lens is prevented from being greatly displaced to an unintended position in an unintended posture every time the measurement head is arranged in the high temperature environment.

In addition, in the measurement head, the housing is made of metal, and the plurality of lenses is made of glass. Therefore, heat resistance of the measurement head is improved by using polyimide having high heat resistance as the polyimide used for the thermal expansion member.

As a result, it is possible to suppress a decrease in reliability of measurement in the high-temperature environment of the confocal displacement sensor.

(Item 15) A confocal displacement sensor according to Item 15 includes:

the measurement head according to any one of Items 1 to 14;

a white light source that generates light to be guided to the measurement head; and a displacement measurement unit that calculates a displacement of a measurement object based on light emitted from the measurement head to the measurement object and reflected by the measurement object.

The confocal displacement sensor includes the above-described measurement head. Accordingly, a decrease in reliability of measurement in a high temperature environment is suppressed.

What is claimed is:

1. A measurement head for a confocal displacement sensor having a white light source, the measurement head comprising:

a metal housing formed in a tubular shape, and having a first end portion and a second end portion;

an optical fiber connected to the first end portion of the metal housing and configured to guide light generated from the white light source to the first end portion of the metal housing;

a plurality of glass lenses including a first lens, accommodated inside the metal housing to be aligned in an axial direction of the metal housing and to be movable in the axial direction, and configured to converge the light guided to the first end portion by the optical fiber on a measurement object through the second end portion while generating a chromatic aberration along an optical axis;

a first movement restricting portion provided in a predetermined first portion inside the metal housing, and restricting movement of the first lens in any one direction of a first direction from the first end portion toward the second end portion in the axial direction and a second direction opposite to the first direction when the first lens abuts on the first movement restricting portion; and a biasing metal member configured to bias some or all of the plurality of glass lenses including the first lens by an elastic force in the one direction in a state where the first lens abuts on the first movement restricting portion.

2. The measurement head according to claim 1, further comprising one or more spacers made of metal and accommodated inside the metal housing to be movable in the axial direction of the metal housing, wherein each of the one or more spacers is provided between two lenses adjacent in the axial direction among the plurality of glass lenses.

3. The measurement head according to claim 1, wherein
the first movement restricting portion abuts on the first lens to restrict the first lens from moving in the first direction, and
the plurality of glass lenses includes a second lens arranged between the first lens and the second end portion in the metal housing,
the measurement head further comprising a second movement restricting portion that is provided in a second portion, which is located between the first portion and the second end portion inside the metal housing, and that abuts on the second lens among the plurality of glass lenses to restrict the second lens from moving in the second direction,
the biasing metal member
being provided between the first lens and the second lens in the metal housing, and
biasing some lenses including the first lens among the plurality of glass lenses in the first direction by an elastic force, and biasing remaining lenses including the second lens among the plurality of glass lenses in the second direction by an elastic force in a state where the first lens abuts on the first movement restricting portion and the second lens abuts on the second movement restricting portion.

4. The measurement head according to claim 3, wherein
the metal housing has a cylindrical inner peripheral surface extending in the axial direction,
the plurality of glass lenses is arranged to allow the light guided to the first end portion to travel in the first direction while expanding a cross-sectional area of the light in a partial region inside the metal housing,
the biasing metal member is formed in a tubular shape extending a certain distance in the axial direction of the metal housing, and is arranged in the partial region in the metal housing, and
the light traveling in the metal housing passes through an inner side of the biasing metal member.

5. The measurement head according to claim 1, wherein
the metal housing has a cylindrical inner peripheral surface extending in the axial direction,
the biasing metal member is formed in a tubular shape extending a certain distance in the axial direction of the metal housing, and is arranged at a position closer to the first end portion than a principal point, which is defined in an optical system in which the plurality of glass lenses is combined, when light travels in the first direction in the metal housing, and
the light traveling in the metal housing passes through an inner side of the biasing metal member.

6. The measurement head according to claim 1, wherein
the metal housing has a cylindrical inner peripheral surface extending in the axial direction,
the biasing metal member is formed in a tubular shape extending a certain distance in the axial direction of the metal housing,
some of the plurality of glass lenses have an effective diameter larger than an inner diameter of the biasing metal member,
the biasing metal member is arranged at a position closer to the first end portion than the some of the plurality of glass lenses inside the metal housing, and
the light traveling in the metal housing passes through an inner side of the biasing metal member.

7. The measurement head according to claim 1, wherein
at least a part of the metal housing has a rectangular tube-shaped outer surface extending in the axial direction and having a rectangular cross section.

8. The measurement head according to claim 1, wherein
the metal housing
includes a first housing section and a second housing section that are sequentially aligned in the first direction, and
has an inner peripheral surface having a cylindrical shape and extending in the axial direction from the first housing section to the second housing section,
an inner diameter of the inner peripheral surface in the first housing section is smaller than an inner diameter of the inner peripheral surface in the second housing section,
the plurality of glass lenses is accommodated in the second housing section, and
an attachment portion configured to attach the measurement head to another member is formed on an outer surface of the first housing section.

9. The measurement head according to claim 1, further comprising a light bending unit that is configured to be detachably attached to the second end portion and bends light emitted from the second end portion in a predetermined direction intersecting the axial direction.

10. The measurement head according to claim 9, further comprising one or more distance adjustment members configured to be detachably attached between the second end portion and the light bending unit and adjust a distance between the measurement head and the light bending unit.

11. The measurement head according to claim 1, wherein the metal forming the metal housing and the biasing metal member is stainless steel.

12. The measurement head according to claim 1, wherein
the first movement restricting portion is configured by connecting a restricting member separate from the metal housing to the first portion inside the metal housing, and
an adhesive made of an inorganic material is used for a connecting portion between the metal housing and the restricting member.

13. The measurement head according to claim 1, further comprising a fiber connection member configured to connect the optical fiber to the first end portion of the metal housing,
wherein the fiber connection member is connected to the first end portion of the metal housing using one or more screws, and
an adhesive made of an inorganic material is used for a fastening portion of each of the one or more screws.

14. A confocal displacement sensor comprising:
the measurement head according to claim 1;
a white light source generating light to be guided to the measurement head; and
a displacement measurement unit configured to calculate a displacement of a measurement object based on light emitted from the measurement head to the measurement object and reflected by the measurement object.

15. A measurement head for a confocal displacement sensor having a white light source, the measurement head comprising:
a metal housing formed in a tubular shape, and having a first end portion and a second end portion;
an optical fiber connected to the first end portion of the metal housing, and configured to guide light generated from the white light source to the first end portion of the metal housing;
a plurality of glass lenses including a first lens, accommodated inside the metal housing to be aligned in an axial direction of the metal housing and to be movable in the axial direction, and configured to converge the light guided to the first end portion by the optical fiber on a measurement object through the second end portion while generating a chromatic aberration along an optical axis;

a first movement restricting portion provided in a predetermined first portion inside the metal housing, and restricting movement of the first lens in any one direction of a first direction from the first end portion toward the second end portion in the axial direction and a second direction opposite to the first direction, when the first lens abuts on the first movement restricting portion; and a thermal expansion polyimide member provided at a position separated from the first movement restricting portion in the axial direction inside the metal housing, wherein some or all of the plurality of glass lenses including the first lens are held between the first movement restricting portion and the thermal expansion polyimide member in a state where the first lens abuts on the first movement restricting portion.

\* \* \* \* \*